(12) United States Patent
Faulkner-Edwards et al.

(10) Patent No.: US 11,213,171 B2
(45) Date of Patent: Jan. 4, 2022

(54) BLENDING BLADE AND APPARATUS

(71) Applicant: PROMiXX LIMITED, Cardiff (GB)

(72) Inventors: Joseph Paul Faulkner-Edwards, Cardiff (GB); William George Houghton-Jones, Cardiff (GB)

(73) Assignee: PROMiXX LIMITED, Cardiff (GB)

( * ) Notice: Subject to any disclaimer, the term of this patent is extended or adjusted under 35 U.S.C. 154(b) by 394 days.

(21) Appl. No.: 16/085,445

(22) PCT Filed: Mar. 14, 2017

(86) PCT No.: PCT/EP2017/056035
§ 371 (c)(1),
(2) Date: Sep. 14, 2018

(87) PCT Pub. No.: WO2017/157965
PCT Pub. Date: Sep. 21, 2017

(65) Prior Publication Data
US 2019/0082893 A1    Mar. 21, 2019

(30) Foreign Application Priority Data

Mar. 14, 2016  (GB) ..................................... 1604330
Sep. 12, 2016  (EP) .................................... 16188425

(51) Int. Cl.
*A47J 43/07* (2006.01)
*A47J 43/046* (2006.01)
*A47J 43/08* (2006.01)

(52) U.S. Cl.
CPC ......... *A47J 43/0722* (2013.01); *A47J 43/046* (2013.01); *A47J 43/0761* (2013.01); *A47J 43/085* (2013.01)

(58) Field of Classification Search
CPC ........................... A47J 43/085; A47J 43/0722
(Continued)

(56) References Cited

U.S. PATENT DOCUMENTS 4,889,248 A    12/1989  Bennett
2005/0099884 A1  5/2005  Lee
(Continued)

FOREIGN PATENT DOCUMENTS

CN    2472624 Y    1/2002
CN    1589720 A    3/2005
(Continued)

OTHER PUBLICATIONS

International Search Report and Written Opinion of the International Searching Authority Application No. PCT/EP2017/056035 Completed: Jun. 2, 2017; dated Jun. 16, 2017 10 pages.
(Continued)

*Primary Examiner* — Elizabeth Insler
(74) *Attorney, Agent, or Firm* — Whitmyer IP Group LLC

(57) ABSTRACT

A blending apparatus blade is described which includes one or more arms and which is configured to be rotated in a first rotational direction to perform a blending operation and in a second rotational direction to perform a mixing operation. The blade may further include a paddle portion which is designed to improve mixing during a mixing operation whilst having minimal impact on the blending operation. Also described is a blending apparatus including this blade. The apparatus is preferably portable and the contents can be sealed within for transport. The apparatus may also include a drinking spout with a removable cap so that the contents can be consumed directly from the apparatus, a method of controlling a blending apparatus is also described.

44 Claims, 21 Drawing Sheets

(58) Field of Classification Search
USPC .......................................................... D7/412
See application file for complete search history.

(56) References Cited

U.S. PATENT DOCUMENTS

| | | | | |
|---|---|---|---|---|
| 2012/0018561 A1* | 1/2012 | Wulf | ................... | A47J 43/0722 |
| | | | | 241/285.1 |
| 2014/0269154 A1* | 9/2014 | Kolar | ................ | B01F 15/00305 |
| | | | | 366/142 |
| 2016/0045075 A1* | 2/2016 | Leppert | ................. | F16H 7/1263 |
| | | | | 366/314 |

FOREIGN PATENT DOCUMENTS

| | | |
|---|---|---|
| CN | 203483306 U | 3/2014 |
| DE | 102014217241 A1 | 3/2016 |
| EP | 2127577 A1 | 12/2009 |
| EP | 3011878 A1 | 4/2016 |
| WO | 2014071993 A1 | 5/2014 |
| WO | 2015028079 A1 | 3/2015 |

OTHER PUBLICATIONS

Chinese Office Action; Application No. 201180017736.1; dated Nov. 16, 2020; 11 Pages.

* cited by examiner

Blend Authorization

Blend Authorization Sequence Security Level

Mix Mode Torque Limiter

Current Monitor

Temperature Monitor

BLENDING BLADE AND APPARATUS

TECHNICAL FIELD

The present invention relates generally, but not exclusively, to blending apparatuses, in particular, to portable blending apparatuses for use with foodstuffs, which are capable of performing both a blending function and a mixing function, and from which the contents can be directly consumed.

BACKGROUND

Existing blenders for use with foodstuffs are designed to produce an increased level of structural homogeneity in their contents.

Typical blenders comprise a housing defining a food chamber and a motor connected to a blade, the blade being disposed within the food chamber. The motor is configured to rotate the blade within the food chamber. The effect of this is that any solid items placed within the food chamber are broken up to create a substance with an advanced level of structural homogeneity. The solids are broken down by both contact with the rotating blade and, where a high torque is produced by the motor, by the intense shear fields produced by the high speed rotation of the blade within the food chamber, which can also break down solids into a smaller pieces.

A disadvantage of such blenders is that they can be damaging to certain more delicate foodstuffs. For example, any protein content within the food chamber can be damaged by the blending process. Protein molecules can become denatured on contact with the rotating blades of the blender and also by the shear forces generated by the rotation of the blades within the substance which is being blended. As such, existing blenders can damage the nutritional value of the food that they are blending. Furthermore, where protein is being added as a food supplement, the efficacy of the added protein can be greatly reduced when blended using such a blender. Specifically, disulphide bonds, which enhance the stability of certain protein molecules, can be cleaved by certain mechanical stressors, such as blending, and thus the proteins denatured.

This can be problematic as there are benefits associated with undenatured proteins. For example, undenatured whey protein provides a rich source of Cystine. Cystine is a dimeric amino acid consisting of two cysteine molecules covalently linked by a disulfide bond (Cystine is considered the rate-limiting factor for intracellular glutathione synthesis since it is not readily available and does not form part of the average diet). Cystine is the ideal delivery system to the cell, passing safely through the gastrointestinal tract and blood plasma. Upon cell entry, the weak disulfide bond is cleaved, providing two cysteine molecules to facilitate intracellular glutathione production.

Mechanical stress such as blending can cleave this covalent bond (thus denaturing the protein) leaving free form cysteine. Free form cysteine is spontaneously catabolised in the gastrointestinal tract and blood plasma, resulting in an ineffective and potentially toxic delivery system to the cell.

Existing devices for mixing protein supplements with liquids comprise a housing defining a chamber for receiving the liquid to be mixed with the protein supplement and the protein supplement. An agitator, which is connected to a motor, is also disposed with the chamber. The agitator is configured such that, upon being rotated, it does not cause the denaturing of proteins upon impact of the proteins with the agitator and it does not generate shear forces which can lead to the denaturing of the proteins.

Such devices, when used to mix a protein supplement with a liquid, are capable of producing a solution, wherein the protein molecules are evenly distributed within the liquid. The level of homogeneity within the resulting mixture is minimal as the constituting protein molecules retain their original form and are merely more evenly distributed within the liquid.

Conventional kitchen top blenders, such as those described in WO 2015028079A1 and US20120018561A1, are operable to rotate a blade in different directions to perform different operations.

WO 2015028079A1 describes an extensive range of blade configurations. One embodiment comprises hinged paddle portions which alter the profile of the blade dependent upon which direction it is rotated in such that a greater amount of resistance is generated in when the blade is being used to mix contents and a lesser amount of resistance is generated when the blade is being used to blend contents. The design is complex and would be costly to manufacture and is also at risk of breaking after prolonged use. In another embodiment the paddle portions are fixed, rather than hinged. In this embodiment, the design of the paddles is such that they would inevitably disrupt the blending process.

US20120018561A1 describes a blender base that may be used with a range of containers. The direction of the blade can be reversed to perform a mixing operation. However, the design of the blade appears to be very similar to that of conventional kitchen top blender blade designs and the features of the blade are designed to improve blending processes. The only feature of the blade which appears to specifically relate to a mixing operation is the provision of a blunt edge on the trailing edge of the blade.

When preparing nutritional supplements with conventional kitchen top blenders, such as those described in WO 2015028079A1 and US20120018561A1, the user is required to decant the contents of the blender housing into a suitable container before consumption. The blender is also required to be connected to a fixed power source, to provide the necessary power for the blending process.

It is noted that conventional kitchen top blender blade designs would not perform an effective mixing operation if rotated in a reverse direction.

SUMMARY

The purpose of the present invention is to address the above outlined drawbacks in conventional blenders. This is achieved, in part with a blending and mixing apparatus which is specifically designed to operate without a fixed power source. Food contents in a liquid base may be efficiently blended or mixed according to user selection. The contents may then be consumed at a convenient point in time from a mouth piece incorporated within the lid of the main container. Efficient operation is achieved, in part, with a novel blade design. In particular, a novel paddle construction of the blade acts to optimise fluid drag at lower rotational speeds.

According to a first aspect of the invention, there is provided a blending apparatus blade comprising one or more arms and configured to be rotated in a first rotational direction to perform a blending operation and in a second rotational direction to perform a mixing operation, wherein the one or more arms each comprise: a first profile on a first edge of the arm, wherein the first edge is a leading edge when the blade is rotated in the first rotational direction and the first profile is configured to perform the blending operation; and a second profile on a second edge of the arm, wherein the second edge is a leading edge when the blade is rotated in the second rotational direction and the second profile is configured to perform the mixing operation.

Advantageously, such a blending apparatus blade is able be used to perform both blending and mixing operations without needing to physically reconfigure a blending apparatus comprising the blade, e.g. by switching blades, in order to perform different operations.

Preferably, the first profile comprises a sharp edge and the second profile comprises a blunt edge.

Preferably, at least one of the one or more arms is an inner arm angled upwardly relative to a plane normal to an axis of rotation of the blade.

Preferably, the inner arm comprises a main portion and a paddle portion, wherein the first edge of the inner arm is disposed on the main portion and the second edge is disposed on the paddle portion.

Preferably, the paddle portion extends from a side of the main portion opposite the first edge.

Preferably, the paddle portion is situated in a plane substantially parallel to the axis of rotation of the blade.

Preferably, the paddle portion is angled inwardly toward the axis of rotation of the blade relative to the main portion.

Preferably, the paddle portion is angled upwardly relative to the main portion.

Advantageously, the paddle portion is configured such that it aids mixing during a mixing operation and has minimal effect on the blending operation.

The design of the paddle is such that it progressively lifts itself out of the fluid vortex as the speed of the vortex increases.

Preferably, the blade comprises two inner arms.

Preferably, the two inner arms are disposed opposite one another about the axis of rotation.

Preferably, at least one of the at least one or more arms is an outer arm, the outer arm comprising a surface angled downwardly relative to a plane normal to the axis of rotation.

Preferably, the surface angled downwardly comprises a distal portion of the outer arm.

Preferably, the surface angled downwardly is further downwardly tilted relative to a direction of movement of the blade in the first rotational direction.

Preferably, the outer arm extends beyond the inner arm in a radial direction relative to the axis of rotation.

Preferably, the blade comprises two outer arms.

Preferably, the two outer arms are disposed opposite one another about the axis of rotation.

Preferably, the blade is rotationally symmetric.

Preferably, at least a portion of the first edge of the one or more arms is swept back in profile to prevent binding and/or lodging, in use.

According to a second aspect of the invention, there is provided a blending apparatus comprising: a housing; a blade according to the first embodiment; a drive means configured to drive the blade in a first rotational direction and a second rotational direction; and a controller configured to control the drive means to selectively rotate the blade in the first rotational direction to perform a blending operation or in the second rotational direction to perform a mixing operation.

Advantageously, such a blending apparatus is able to perform both blending and mixing operations using the same blade and without needing to physically reconfigure the blending apparatus.

Preferably, the blending apparatus further comprises a base and a power source, wherein the power source and the drive means are housed in the base and, optionally, wherein the power source is a battery.

Preferably, the base is removable from the housing.

Preferably, the apparatus further comprises a lid which sealingly engages with an open end of the main housing, preferably, the lid further comprises a drinking spout with a removable cap.

Preferably, the apparatus is portable.

Preferably, the housing is sealable such that the contents of the apparatus can be sealed within the housing for transport.

Advantageously, the blending apparatus is convenient and can process food, be dropped into a sports bag as it is completely sealable, and its contents can be consumed directly from the apparatus via the drinking spout.

Preferably, the apparatus further comprises a USB outlet for providing power for charging other devices.

Preferably, the apparatus further comprises an accelerometer for detecting the orientation of the apparatus.

Preferably, the first profile is configured such that, when rotated in the first direction at a predetermined speed, contents within the housing are blended and, wherein the second profile is configured such that, when rotated in the second direction at a second predetermined speed, contents within the housing are mixed.

Preferably, the apparatus further comprises an active electronic feedback speed control mechanism.

According to a third aspect of the invention, there is provided a method, at a controller, of controlling a blending apparatus, the method comprising the steps of: in response to a selection of a first blending mode, controlling a drive means to rotate a blade in a first rotational direction at a first speed to perform a blending operation; and in response to a selection of a mixing mode, controlling the drive means to rotate the blade in a second rotational direction at a second speed to perform a mixing operation.

Preferably, the first speed is greater than the second speed, preferably wherein the first speed is in the range of 6,000 to 9000 rpm, and more preferably wherein the first speed is 7,000 rpm, and preferably wherein the second speed is in the range of 3,000 to 5,000 rpm, and more preferably wherein the second speed is 4,000 rpm.

Preferably, the method further comprises the step of determining whether or not a blending operation has been authorized.

Preferably, the step of controlling a drive means to rotate a blade in a first rotational direction at a first speed to perform a blending operation only occurs if a blending operation has been authorized.

Preferably, the step of determining whether or not a blending operation has been authorized further comprises determining whether or not a security sequence has been correctly entered.

Preferably, the step of determining whether or not a blending operation has been authorized further comprises the detecting whether the blending apparatus is in a predetermined orientation.

Preferably, the method further comprises the step of determining whether or not the torque limit of a motor of the blending apparatus exceeds a pre-defined torque limit and, optionally, slowing down, switching off or braking the motor if the pre-defined torque limit is exceeded.

Preferably, the method further comprises the step of, in response to a subsequent selection, controlling the drive means to cease rotation of the blade.

Preferably, the subsequent selection is a de-selection.

Preferably, the step of controlling the drive means to rotate the blade in the first rotational direction to perform the blending operation further comprises, in response to a subsequent selection of a second blending mode, controlling the drive means to rotate the blade in the first rotational direction at a third speed greater than the first speed, preferably, wherein the third speed is in the range of 10,000 to 14,000 rpm and, more preferably, wherein the third speed is 11,000 rpm.

Preferably, the step of controlling the drive means to rotate the blade in the first rotational direction at the third speed greater than the first speed further comprises, in response to a subsequent constant selection of a third blending mode, controlling the drive means to rotate the blade in the first rotational direction at a fourth speed greater than the third speed for the duration of the constant selection of the third blending mode, preferably, wherein the fourth speed is in the range of 15,000 to 20,000 rpm, and, more preferably, wherein the fourth speed is 16,000 rpm.

Preferably, the step of controlling the drive means to rotate the blade in the first rotational direction at the fourth speed for the duration of the constant selection of the third blending mode, further comprises the step of, in response to an end of the constant selection of the third blending mode, controlling the drive means to rotate the blade in the first rotational direction at the third speed.

Preferably, the step of controlling the drive means to rotate the blade in the first rotational direction at the third speed greater than the first speed further comprises, in response to a subsequent selection of the first blending mode, controlling the drive means to rotate the blade in the first rotational direction at the first speed.

Preferably, the step of controlling the drive means to rotate the blade in the first rotational direction at the first speed further comprises, in response to a subsequent selection, controlling the drive means to cease rotation of the blade.

Preferably, the subsequent selection is a de-selection.

BRIEF DESCRIPTION OF THE DRAWINGS

Embodiments of the present invention will now be described, by way of example only, with reference to the accompanying drawings, in which:

FIG. 2b depicts a top down on view of the blade shown in FIG. 2a;

FIGS. 2c and 2d depict side on views of the blade shown in FIG. 2a;

FIG. 2e depicts a cross-section of an outer arm of the blade shown in FIG. 2a;

FIG. 2f depicts a cross-section of an inner arm of the blade shown in FIG. 2a;

DETAILED DESCRIPTION

Figure 1:
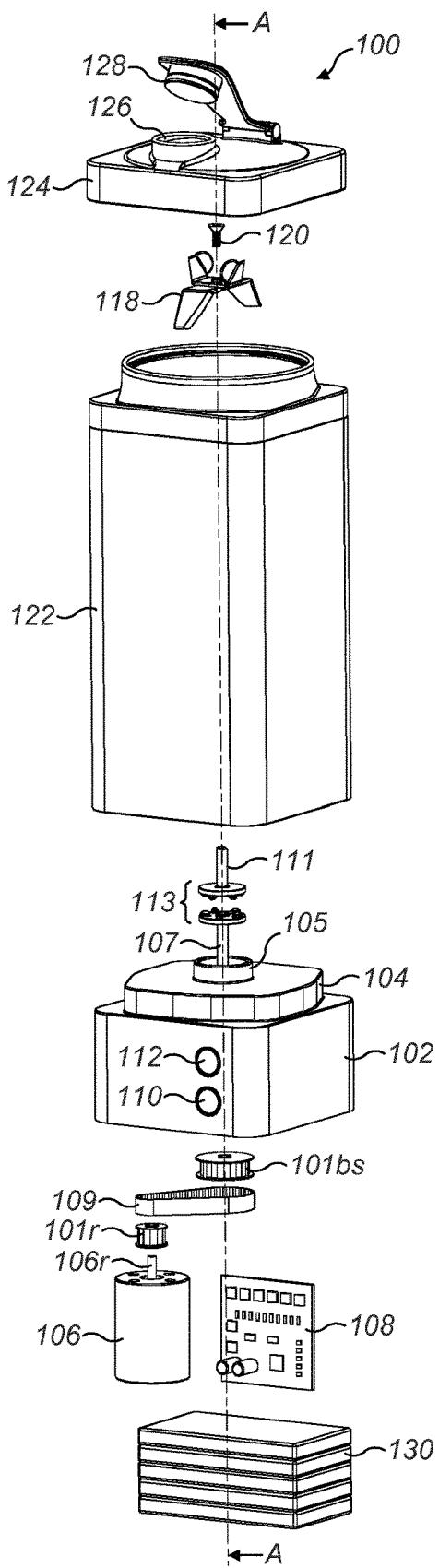
FIG. 1 depicts an exploded view of a blender according to the present invention.

FIG. 1 depicts an exploded view of a blender 100 according to one embodiment. The blender 100 shown in FIG. 1 comprises a motor housing 102 and motor housing lid 104. A motor 106 and a motor control circuit or controller 108, which may be in the form of a printed circuit board, is disposed within the motor housing 102. The motor housing 102 acts as a base of the blender 100. A lower button (mix button) 110 and an upper button (blend button) 112 are disposed on an outer surface of the motor housing 102 and can be used to control the operation of the motor 106. The motor housing lid 104 comprises an aperture 105 through which a base shaft 107 projects when the blender 100 is assembled. The base shaft 107 is able to rotate freely relative to the motor housing lid 104.

The base shaft 107 is coupled to a rotor 106r of the motor 106 via a belt 109 connected between a rotor pulley 101r, coupled to the rotor 106r, and a base shaft pulley 101bs, coupled to the base shaft 107, when the blender 100 is assembled such that rotation of the motor rotor 106r rotates the base shaft 107. The base shaft 107 is coupled to a main housing shaft 111 via a mechanical coupling 113, shown in the form of two mechanical coupling plate portions, one disposed at an end of each shaft 107 and 111, comprising protruding abutments for facilitating the transfer of rotational energy, such that rotation of the base shaft 107 is transmitted to the main housing shaft 111.

Any suitable coupling may be used, for example, the mechanical coupling plate portions of the base shaft 107 and the main housing shaft 111 may be bonded to one another. Preferably, the mechanical coupling is in the form of a removable coupling, such as interlocking teeth or abutments disposed on each of the mechanical coupling plate portions. The mechanical coupling 113 may comprise a magnetic coupling where, for example, two mechanical coupling plate portions, one disposed at an end of each of the base shaft 107 and main housing shaft 111, each comprise a magnet which contacts and forms a magnetic coupling with the corresponding magnet of the other of the base shaft 107 and main housing shaft 111.

Alternatively, the coupling may be in the form of two magnets, one disposed at an end of each of the base shaft 107 and main housing shaft 111, which are magnetically coupled and which are not in contact with one another.

The rotor pulley 101r, base shaft pulley 101bs and belt 109 may all be toothed to prevent any slipping of the belt.

The base shaft pulley 101bs may be of larger diameter than the rotor pulley 101r. This arrangement allows the motor rotor shaft 106r to turn at a faster rate than base shaft 107. The speed ratio between the two shafts may be set such that the rotational speed of the motor rotor 106r is optimal over the design rpm range of the blade 118, thus maximising available power transfer.

A main housing 122 is configured to sit on top of the motor housing lid 104. The main housing shaft 111 passes through a sealed main housing bearing 116 (shown in FIGS. 1a and 1b) in the base of the main housing 122, which allows the main housing shaft 111 to rotate freely relative to the main housing 122. The main housing shaft 111 is coupled to the base shaft 107 via the mechanical coupling 113, as described above.

Figure 1A:
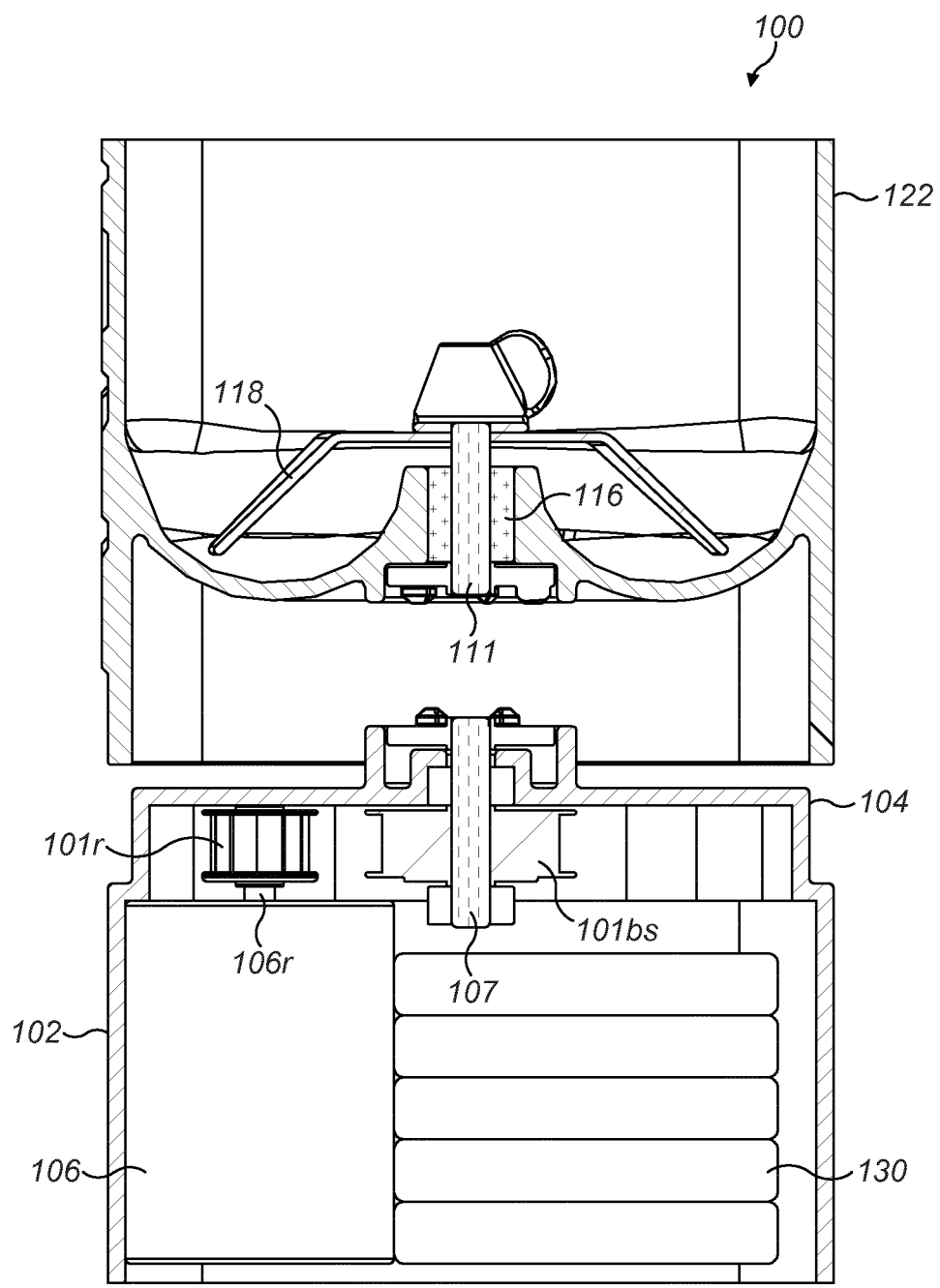
FIG. 1a depicts the blender shown in FIG. 1 when partially assembled.

FIG. 1a depicts the blender 100 shown in FIG. 1 when partially assembled, with the motor housing/base 102 removed from the main housing 122.

Figure 1B:
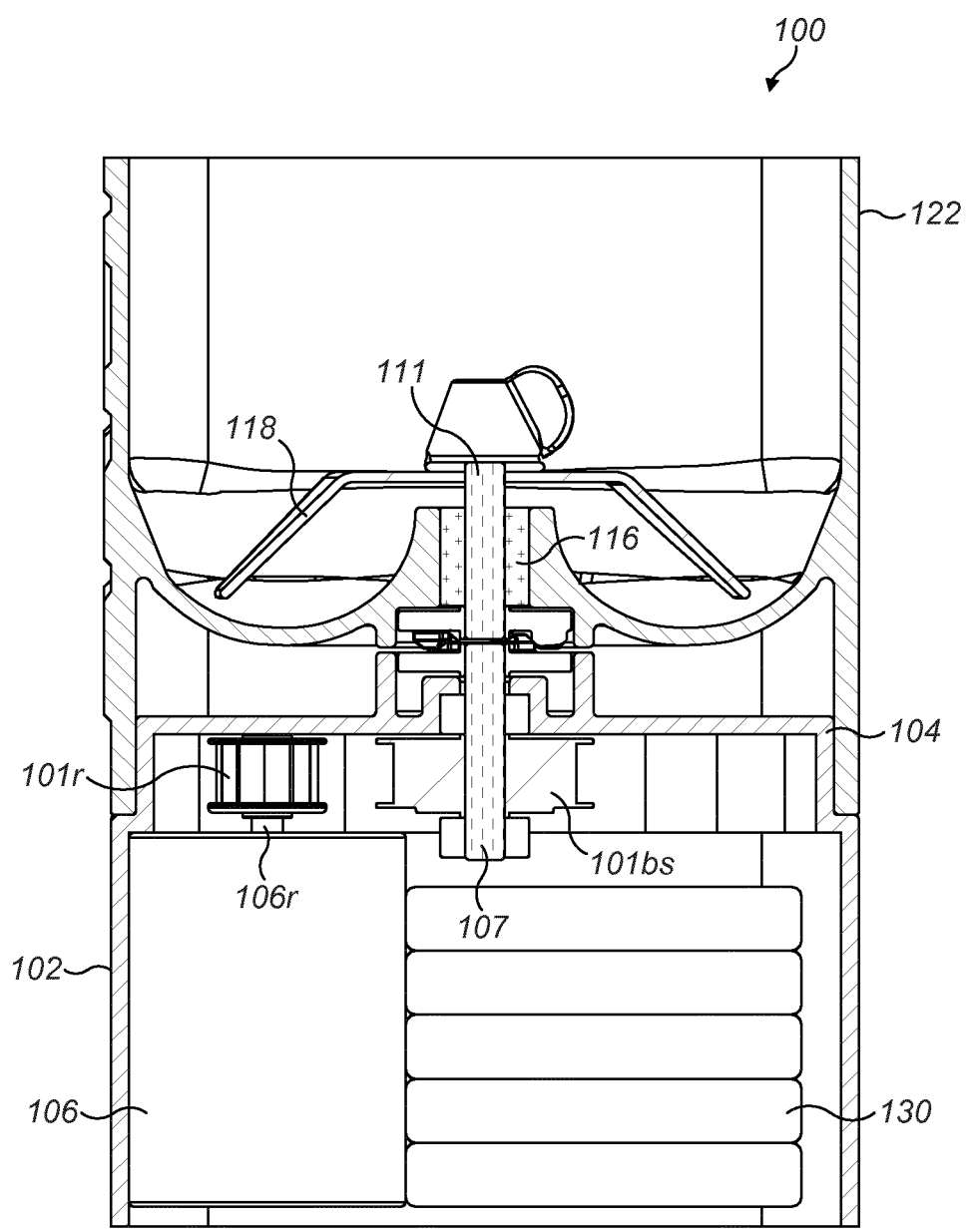
FIG. 1b depicts the blender shown in FIG. 1 when fully assembled.

FIG. 1b depicts the blender 100 shown in FIG. 1 when fully assembled with the motor housing/base 102 and the main housing 122 coupled together and the base shaft 107 and the main housing shaft 111 coupled together.

As shown in FIGS. 1a and 1b, the mechanical coupling end of the base shaft 107 extends part way out of the motor housing lid 104 through the aperture 105, such that when the main housing 122 sits on top of the motor housing 104, the mechanical coupling end of the base shaft 107 meets with the mechanical coupling end of the base shaft 107 to form a mechanically linked pair, locking the rotation of the lower shaft 107 to the main housing shaft 111 (shown in FIG. 1b).

The sealed bearing 116 is located within a central aperture of main housing 122. The central aperture of the main housing 122 is sealed by virtue of the sealed main housing bearing 116. A blade 118 is placed on top of the bearing 116 and a screw 120 may be used to retain the blade 118 against the bearing 116 and the main housing shaft 111 such that the blade 118 turns with the main housing shaft 111. Although a screw 120 is shown in FIG. 1, the blade 118 may be attached to the bearing 116 and main housing shaft 111, for example, via a cold weld.

Finally, a lid 124 is provided which sealingly engages with an open top end of the main housing 122. As such, the main housing 122 is completely sealed when the lid 124 is placed on top thereof. The lid 124 may comprise a drinking spout 126 with a removable cap 128, as shown in FIG. 1.

A power supply 130 for powering the motor 106 and controller 108 is also disposed within the motor housing 102. The power supply may be in the form of a rechargeable battery, in which case the blender 100 may be portable. A charger inlet may also be provided in a wall of the motor housing 102, allowing the battery to be recharged.

The mix button 110 and blend button 112 can be used to select various modes of operation of the blender 100. The motor 106 can be driven to rotate in both a clockwise and a counter clockwise direction to perform a mixing operation and a blending operation respectively.

Line AA represents the axis of rotation of the blade 118 and also the longitudinal axis of the blender 100.

Advantageously, the blender of the embodiments described herein is portable, as the control systems ensure optimal performance and efficiency which enables a smaller motor 106 and battery 130 to be used without compromising the function of the blender 100.

In an exemplary blender, the size of the motor may be 28 mm diameter and 38 mm in length, excluding the shaft.

The proposed size of the battery pack may be 70 mm long, 40 mm wide and 32.5 mm deep.

A lithium iron phosphate (LiFePO4) battery consisting of 5 individual cells may be used. Lithium iron phosphate batteries offer an improved level of safety over cobalt based lithium ion cells as well as a longer service life.

The blender may be 225 mm tall and 75 mm wide.

The blender of the embodiments described herein has many other advantages, including that it may be easily and securely held in the hand, is suitable for use on the move, can both mix and blend its contents, its contents can be drank directly from it, its durable design means it can be used for several mixing and/or blending operations, and it may be rechargeable.

An embodiment of the blade 118 is depicted in detail in FIGS. 2a to 2f. The blade comprises a central hub 201 and four arms: two inner arms 202; and two outer arms 208. Each arm is connected to the central hub 201. The blade 118 is rotationally symmetric about the axis of rotation AA.

Each inner arm 202 comprises a main portion 203 coupled to the central hub 201 and a paddle portion 206 coupled to the main portion 203.

The main portion 203 further comprises a first profile 204 on a first edge. The first edge is a leading edge when the blade is rotated in an anticlockwise direction AC (shown in FIG. 2b).

The first profile 204 is configured to perform a blending operation. The first profile 204 is shown as a sharp edge 204 in FIGS. 2a to 2f.

A blending operation is an operation where the contents of the blender 100 are advanced towards an increased level of structural homogeneity. A blending operation is an operation whereby the liquid and solid contents of the blender 100 are combined to form a uniform whole such that the constituent parts become indistinguishable from one another.

The paddle portion 206 is coupled to an end of the main portion 203 opposite the first profile 204 on the first edge. The paddle portion 206 is angled towards the axis of rotation AA relative to the main portion 203. As can be seen clearly in FIG. 2b, both paddle portions 206 lie along tangents of a circle with its center at the axis of rotation AA of the blade 118, although this is merely an example arrangement and the angles of the paddle portions may vary.

The paddle 206 further comprises a second profile 207 on a second edge opposite the edge which is coupled to the main portion 203. The second edge is a leading edge when the blade is rotated in a clockwise direction C (shown in FIG. 2b).

The paddle 206 and second profile 207 are configured to perform a mixing operation. The second profile 207 of the paddle 206 is shown as a blunt edge 207 in FIGS. 2a to 2f.

A mixing operation is an operation where the contents of the blender 100 become more evenly distributed. For example, where an insoluble powder and a liquid are mixed, the powder becomes more evenly distributed within the liquid. The level of homogeneity within the mixture on a microscopic level would remain low as all the solid particles that made up the power would be intact. Essentially solid particles are redistributed as opposed to being broken down into smaller pieces.

When mixing, the significantly lower rotational speed of blade assembly, when compared to blending, ensures that the paddle 206 remains within the fluid vortex. A slowly rotating fluid vortex within the main housing 122, will form a less deep central air void, when compared to higher rotational speeds. While situated within the fluid vortex the paddle presents a significant projected cross sectional area to the surrounding fluid, in a plane normal to the direction of travel. This imparts significant drag within the fluid and the resulting fluid turbulence enhances the mixing process.

The main portion 203 and paddle portion 206 of each inner arm 202 may comprise an integrally formed unit.

Figure 2A:
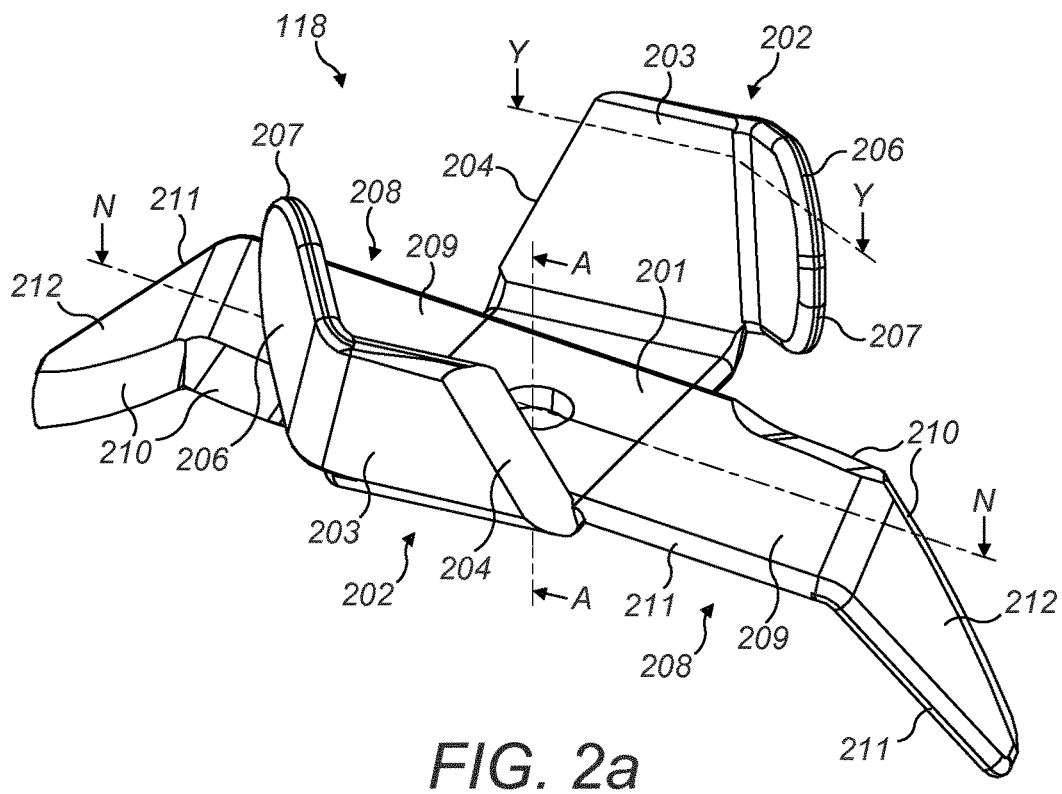
FIG. 2a depicts a perspective view of a blade according to the present invention.

The inner arms 202 are angled upwardly relative to the plane which is normal to the axis of the rotation AA and which intersects axis NN, shown in FIG. 2a. Further, the paddle portion 206 of each inner arm 202 is angled upwardly relative to its respective main portion 203, as shown in FIG. 2c.

Each outer arm 208 comprises a main portion 209 coupled to the central hub 201 and a tip portion 212 coupled to the main portion 209 at an end of the main portion 209 opposite to the central hub 201. The tip portion 212 is angled downwardly relative to the plane which is normal to the axis of rotation AA and which intersects the axis NN.

The main portion 209 or each outer arm 208 lies in the plane which is normal to the axis of rotation AA and which intersects the axis NN. The tip portion 212 of each outer arm 208 is tilted, as is described in detail below.

Both of the main portion 209 and the tip portion 212 of each of the outer arms 208 comprise a first profile 210 on a first edge. The first edge is a leading edge when the blade is rotated in an anticlockwise direction AC (shown in FIG. 2b).

The first profile 210 is configured to perform the blending operation. The first profile 210 is shown as a sharp edge 210 in FIGS. 2a to 2f.

Both of the main portion 209 and the tip portion 212 of each outer arm 208 further comprise a second profile 211 on a second edge opposite the first edge. The second edge is a leading edge when the blade is rotated in a clockwise direction C (shown in FIG. 2b).

The second profile 211 is configured to perform a mixing operation. The second profile 211 is shown as a blunt edge 211 in FIGS. 2a to 2f.

The main portion 209 and the tip portion 212 of each outer arm 208 may comprise an integrally formed unit.

The main portion 203 and paddle portion 206 of each inner arm 202, the main portion 209 and the tip portion 212 of each of the outer arms 208 and the central hub 201 may comprise an integrally formed unit.

Figure 2B:
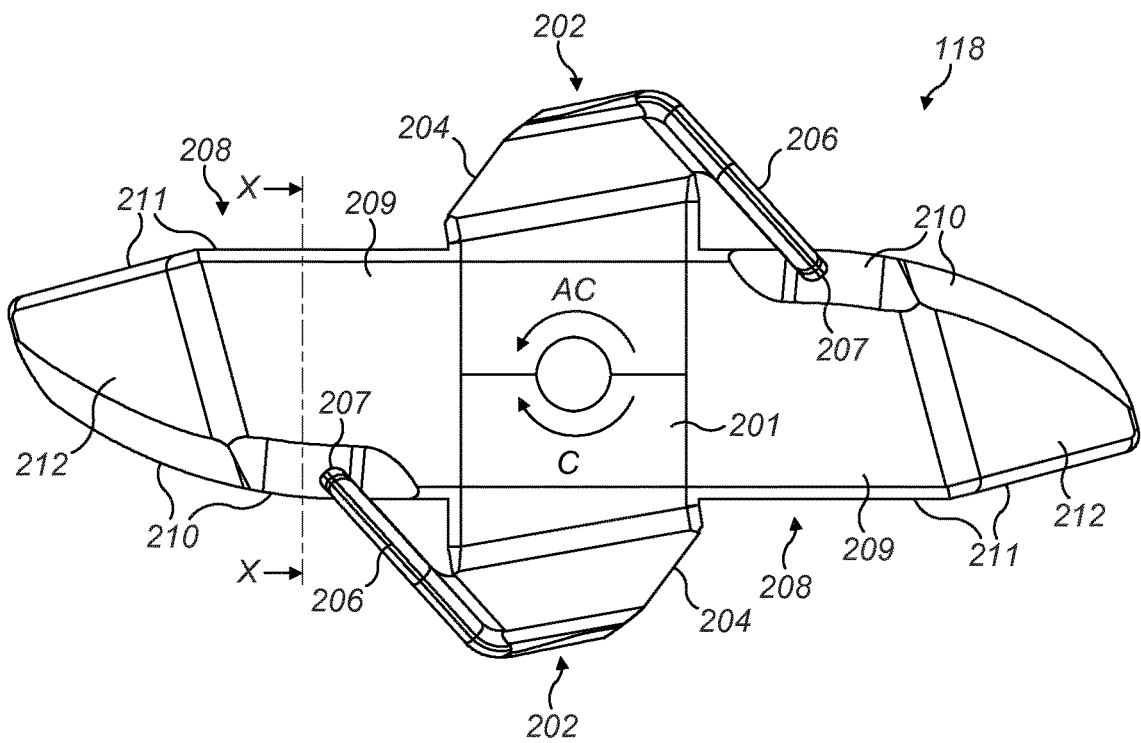
Figure 2C:
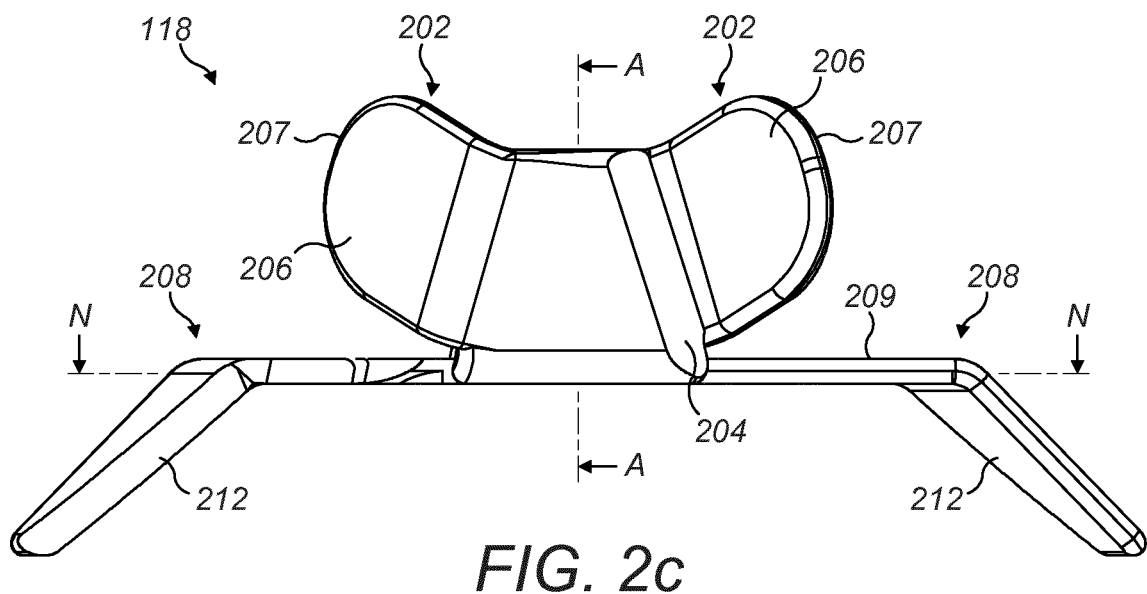

FIG. 2b depicts a top down view of the blade 118 shown in FIG. 2a.

The sharp edges 204 and 210 of both the inner and outer arms 202 and 208 are respectively disposed on what constitute the leading edges of the inner and outer arms 202 and 208 when the blade 118 is rotated in an anticlockwise direction represented by the arrow AC shown in FIG. 2b. The blunt edges 207 and 211 of the inner and outer arms 202 and 208 are each disposed on the leading edges of the inner and outer arms 202 and 208 when the blade 118 is rotated in the clockwise direction represented by the arrow C in FIG. 2b.

The blade 118 is configured to be rotated in the anticlockwise direction AC to perform a blending operation and to be rotated in a clockwise direction C to perform a mixing operation, as shall be described in greater detail below.

It will be understood that the blade 118 could equally be configured to be rotated in a clockwise direction C to perform a blending operation and to be rotated in the anticlockwise direction AC to perform a mixing operation by making suitable alterations to the design of the herein described blade 118.

FIG. 2c depicts a side on view of the blade 118. As shown clearly in FIG. 2c, the tip portions 212 of the outer arms 208 are angled downwardly relative to the plane which is normal to the axis of rotation AA and which intersects the axis NN.

Further, the tip portions 212 are tilted relative to the direction of movement of the outer arm 208 such that the tip portions 212 are tilted downwardly relative to the anticlockwise direction of movement AC and upwardly relative to the clockwise direction of movement C. The tilt of the tip portions 212 is such that a small cross sectional area of the upper surface of portion 212, with respect to an anticlockwise direction of travel, is presented to the contents thus contributing to a net upward thrust. In combination with the downward facing angle of portion 212 relative to the plane which is normal to the axis of rotation AA and which intersects the axis NN, the net thrust is upward and outward for an anticlockwise rotation.

It can also be seen from FIG. 2c that the paddle portions 206 are angled upwardly relative to the main portions 203.

Figure 2D:
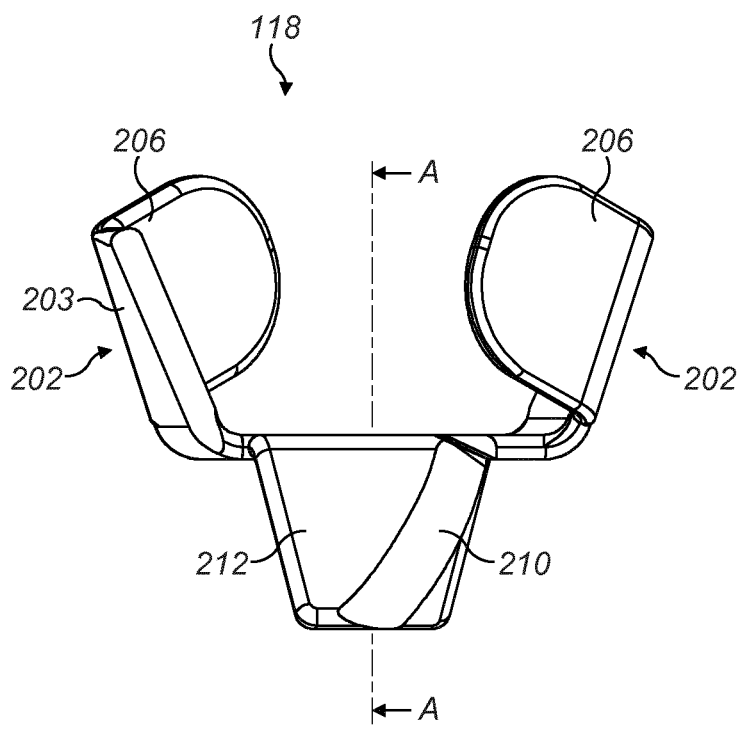

FIG. 2d depicts a further side on view of the blade 118. It can be seen that the sharp edge 210 of the tip portion 212 is swept back towards a distal end of the tip portion 212.

Figure 2E:
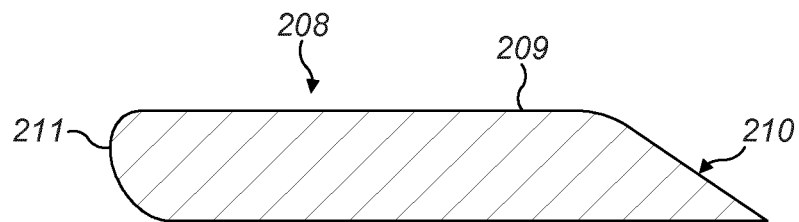

FIG. 2e depicts a cross-section of an outer arm 208 taken along the line XX, shown in FIG. 2b. The cross-section is of the main portion 209 of an outer arm 208 and clearly shown are the first profile 210 and the second profile 211 of the main portion 209 of the outer arm 208. The first profile 210 is shown as a sharp edge 210. The second profile 211 is shown as a rounded blunt edge 211.

Figure 2F:
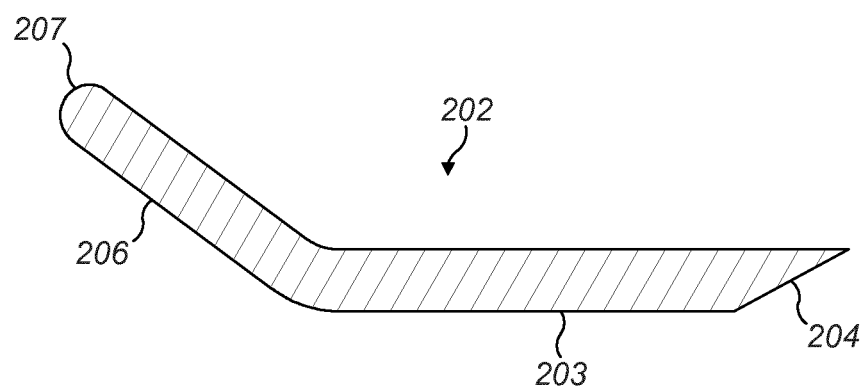

FIG. 2f depicts a cross-section of an inner arm 202 along the line YY shown in FIG. 2a, illustrating how the paddle portion 206 is angled relative to the main portion 203, and also clearly showing the respective cross-sectional profiles of the first profile 204 is shown as a sharp edge 204 and the second profile 207 which is shown as a rounded blunt edge 207.

Figure 3A:
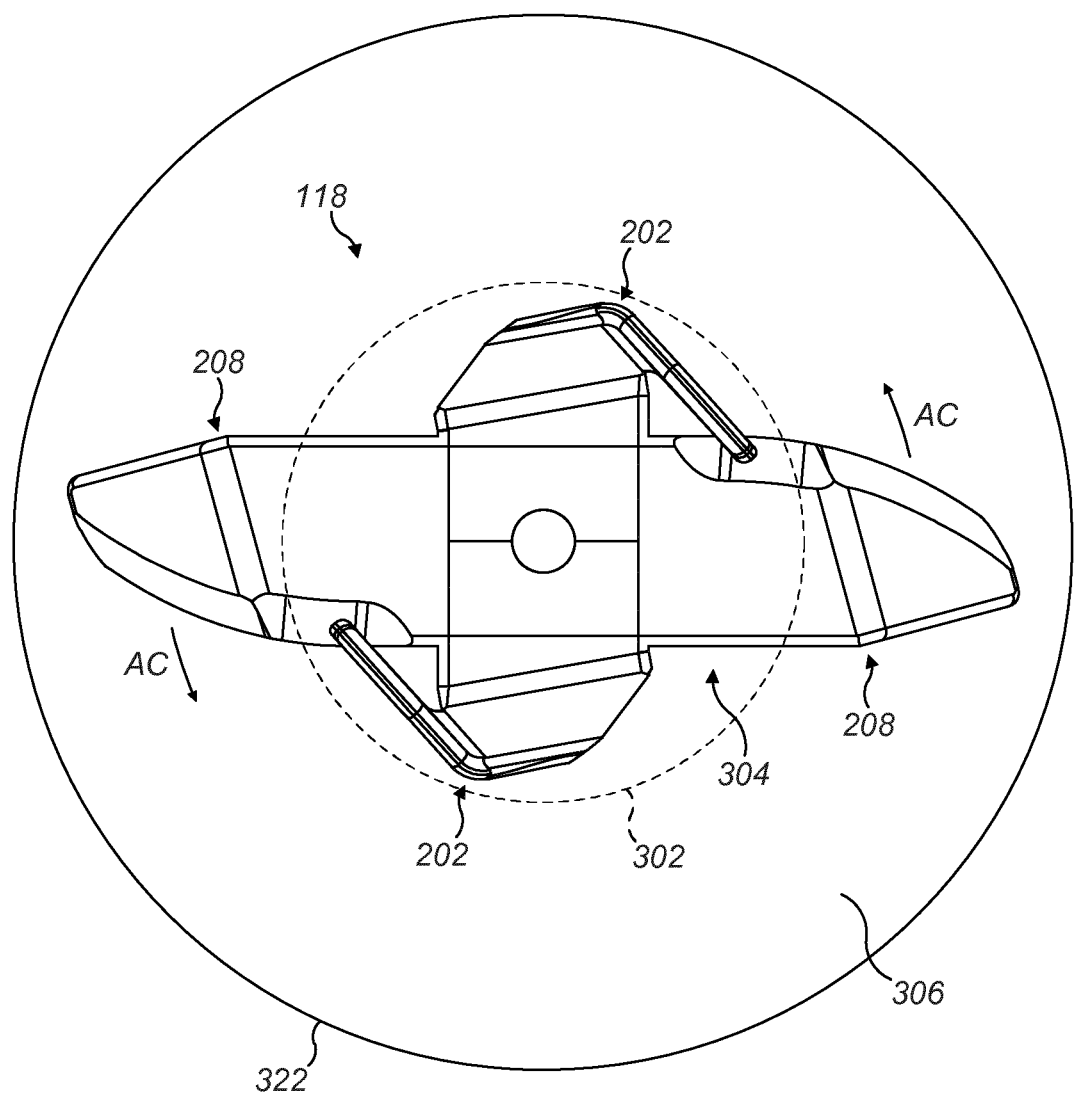
FIG. 3a depicts a top down view of the blade shown in FIG. 2a during a blending operation.

FIG. 3a depicts a top down view of the blade 118 during a blending operation, wherein the blade 118 is rotating in the anticlockwise direction shown by the arrows AC. When rotating in this direction, the sharp edges 204 and 210 of the arms 202 and 208 comprise leading edges. An inner surface 322 of the main housing 122 of the blender 100 is depicted. A dotted line 302 represents the typical location of an inner wall of a fluid vortex 306 that is formed during a blending operation, and within which the fluid and/or solid contents are contained.

The location of the inner wall 302 of the vortex 306 is dependent upon a number of factors including the rotational speed of the blade 118 (which is dependent upon the torque produced by the motor 106 and the properties of the fluid and/or solid substances which are being blended), the configuration of the blade 118 and the configuration of the inner surface 322 of the main housing 122. As such, it will be appreciated that the inner wall 302 of the vortex 306 shown in FIG. 3a is merely the typical location and the blender 100 may be designed in such a way that, during a typical blending operation where typical substances are being blended, the inner wall 302 of the vortex 306 will be in the region of the dotted line shown in FIG. 3a.

Region 304 is an air void defined by the inner wall 302 of the vortex 306.

The mode of operation shown in FIG. 3a is a high speed blend and it can be seen that the blender 100 is designed such that, during a high speed blending operation, the inner wall 302 of the vortex 306 is located radially outside of the inner arms 202 of the blade 118 such that there is little or no interaction between the surfaces of the inner arms 202 and the vortex 306. It will be understood that large solid components of the vortex 306 may fall within the region 304 as the substances being blended advance towards homogeneity (as the larger solid objects are broken down, the occurrence of any matter within the air void 304 will be increasingly reduced).

Figure 3B:
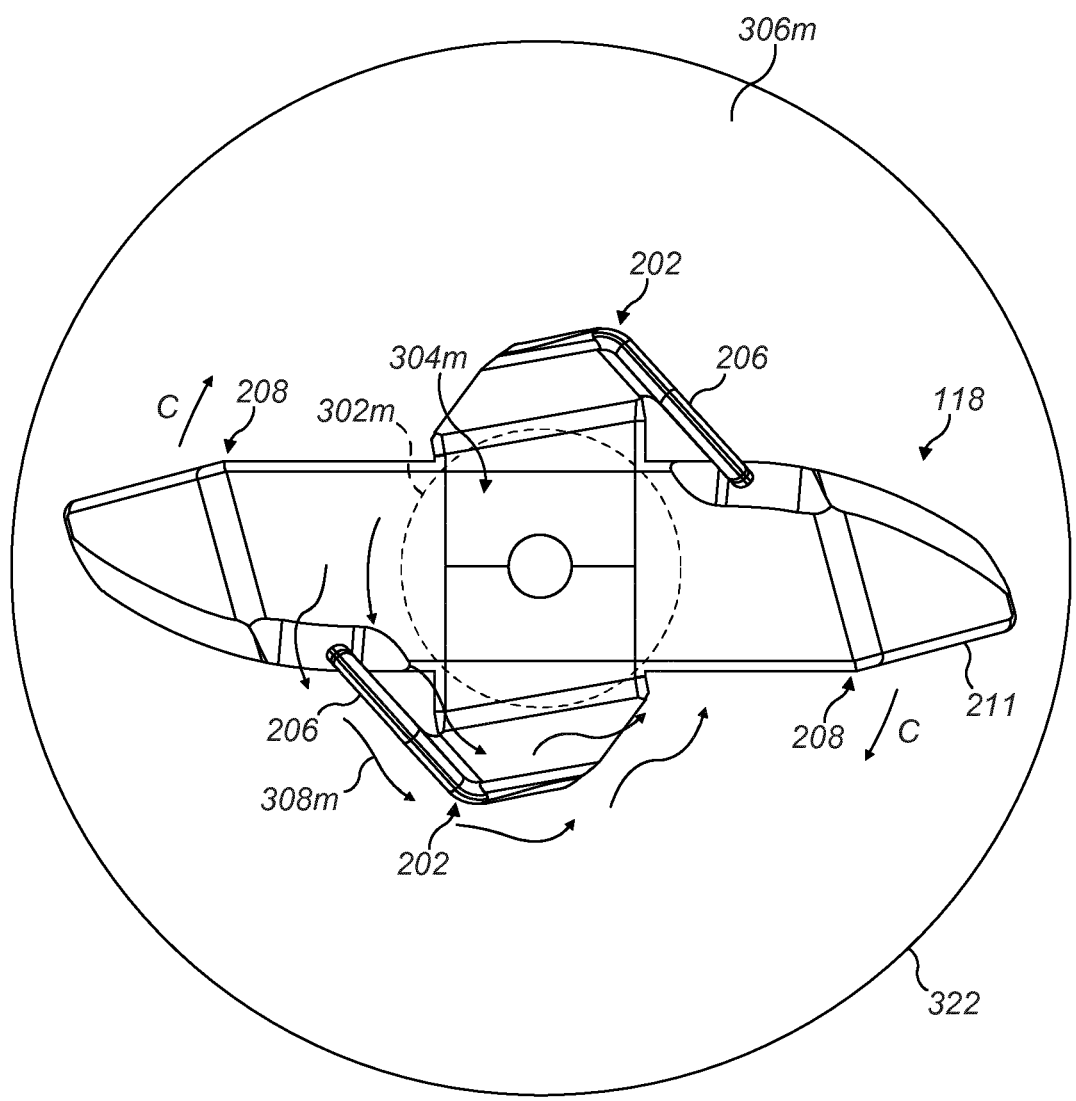
FIG. 3b depicts a top down view of the blade shown in FIG. 2a during a mixing operation.

FIG. 3b depicts a top down view of the blade 118 during a mixing operation, wherein the blade 118 is being rotated in the clockwise direction C, such that the blunt edges 207 and 211 of the arms 202 and 208 comprise the leading edges.

The mixing operation is performed at a lower speed then the blending operation such that the inner face 302m of the vortex 306m is situated much closer to the center of the blade 118. As such, it can be seen that, unlike in the high speed blending mode of operation, the inner arms 202 are disposed within the fluid vortex 306m.

The arrows shown in region 308m illustrate the movement of the contents of the blender 100 relative to the blade 118 during the mixing operation. The path of the fluid contents of the blender 100 is forced to follow the contours of the presenting inner arms 202. The resultant inward and outward movement of the fluid contents results in turbulence and contributes to a net rotational resistance. The rotational resistance leads to the formation of the vortex 306m. The passage of the blunt edges 211 of the outer arms 208 through the vortex 306m also increases the rotational resistance.

The surfaces of the arms 202 are angled such that there will be little or no net thrust in any direction during a mixing operation. The paddle portion 206 is situated/lies in a substantially vertical plane. In other words, the paddle portion 206 is situated/lies in a plane substantially parallel to an axis of rotation of the blade. As paddle portion 206 rotates about the central axis in the clockwise direction C it does not produce a significant upward or downward thrust. This ensures that there is no significant disruption to the cycling of the fluid contents which is generated by the outer arms 208.

Figure 4:
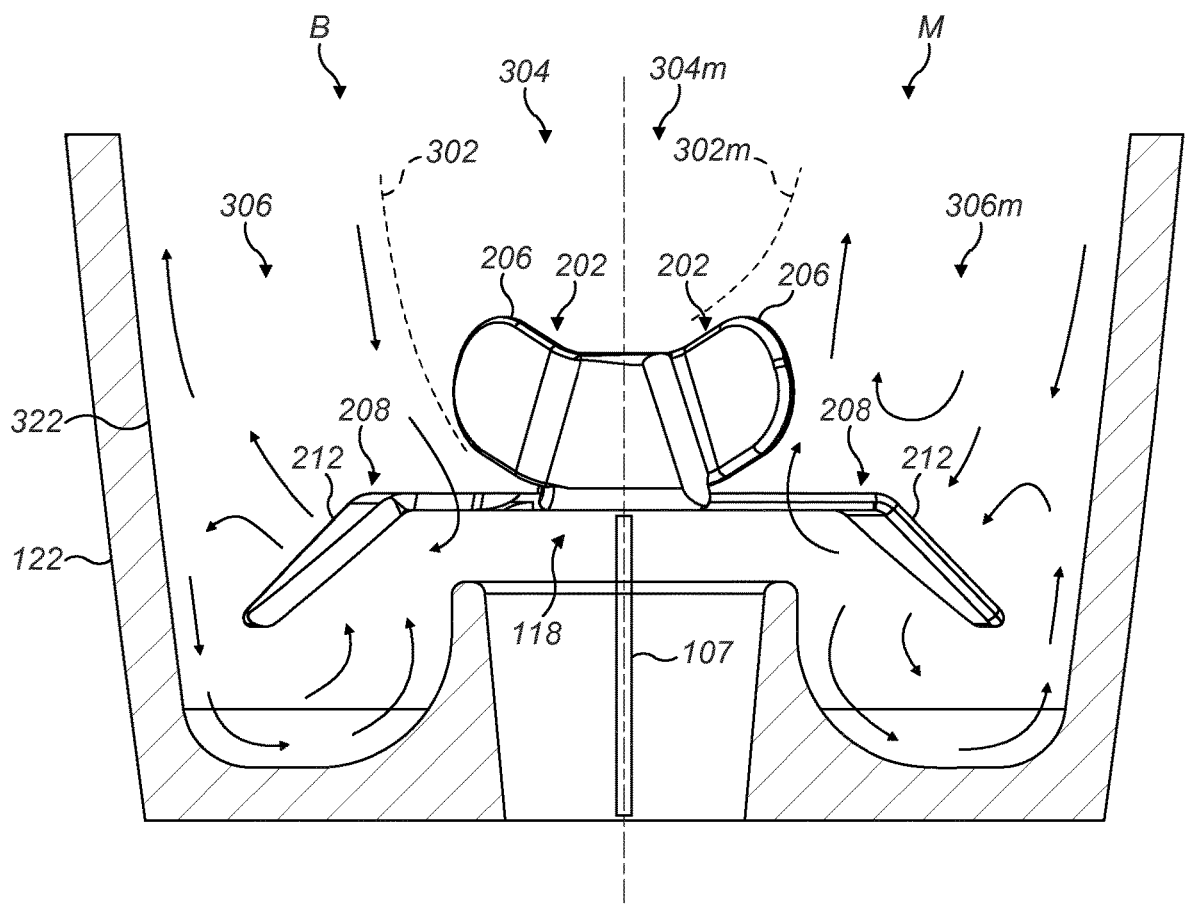
FIG. 4 depicts a side on view the fluid flow within the blender around the area of the blade during both the blending and mixing operations.

FIG. 4 depicts a side on view of the fluid flow within the blender 100 around the area of the blade 118 during both the blending and mixing operations. The left hand side B of FIG. 4 depicts the fluid flow around the area of the tip portion 212 of the outer arm 208 during a blending operation and the right hand side M of FIG. 4 depicts the fluid flow around the tip portion 212 of the outer arm 208 during a mixing operation.

Also shown are the respective vortexes 306 and 306m, inner walls thereof 302 and 302M and the air voids 304 and 304M, for the blending and mixing operations. The main housing 122 and the inner surface 322 of the main housing 122 of the blender 100 are also shown.

As shown in FIG. 4, the vortex 306 on the left hand 'blending operation' side B is deeper than the vortex 306m of the mixing operation. The inner surface of the vortex 302 defines an air void 304 within which the inner arms 202 sit, such that there is little or no interaction between the surfaces of the inner arms 202 and the vortex 306.

In contrast, the vortex 306m on the right hand 'mixing operation' side M is shallower than the vortex 306 of the blending operation. The inner surface of the vortex 302m defines an air void 304m. The inner arms 202 do not sit within the air void 304m and the surfaces of the inner arms 202 do interact with the vortex 306.

It can be seen clearly in FIG. 4 that the upward angling of the paddle portion 206 mirrors the profile of the inner portion 302 of the vortex 306 such that the paddle portion 206 of the inner arm 202 is kept out of the vortex 306 during a blending operation.

It can also be seen that the tip portion 212 of the outer arm 208 is downwardly tilted relative to the anticlockwise direction of movement of the blade 118 during a blending operation such that a small cross sectional area of the upper surface of portion 212 is presented to the contents thus contributing to a net upward thrust. This downward tilting in conjunction with the general downward angling of the tip portion 212 relative to the plane which is normal to the axis of rotation AA and which intersects the line NN causes the blade 118 to generate upward and outward thrust when rotated anticlockwise during a blending operation, as shown by the arrows about the tip portion 212 of the outer arm 208 in FIG. 4. This results in fluid movement in the direction of the generated thrust which, due to the profiling of the inner surface 322 of the main housing 122, generates opposing fluid flows above and below the tip portion 212 of the outer arm 208, as shown by the arrows on the left hand most side B in FIG. 4. This results in a "churning" effect, meaning that the blender 100 can efficiently blend all of the contents as a flow cycle is created, as shown in side B of FIG. 4. This ensures that all of the contents of the blender 100 are brought into contact with the blade 118.

The right hand side M of FIG. 4 depicts a mixing operation, wherein the fluid vortex 306m is less deep, and wherein the inner surface 302m of the vortex 306m is such that the inner arms 202 are disposed within the vortex 306m. The tilting and downward angling of the tip portion 212 of the outer arm 208 is such that rotating the blade 118 in a clockwise direction to perform the mixing operation generates downward and inward thrust as shown by the arrows on the right hand side M in FIG. 4. This results in fluid movement in the direction of thrust generating opposing fluid flows above and below the tip portion 212 of the outer arm 208, as shown by the arrows on the right hand most side M in FIG. 4. This creates a "churning" effect which has the same properties of the above described churning effect of the blending operation in that all of the contents of the blender 100 will be efficiently mixed as the contents is cycled to within the vicinity of the blade.

The operation of the blade 118 relies on the variable depth of the generated vortex. The depth is dependent on three main factors:

1) the rotational speed of the vortex 306 and 306m (the faster the vortex 306 and 306m rotates, the higher the contents will "climb" the inner surface 322 of the main housing 122, and the deeper the air pocket 304 and 304m of the vortex 306 and 306m will be);

2) the quantity of fluid (the more fluid in the main housing 122, the less deep the air pocket 304 and 304m of the vortex 306 and 306m will be); and 3) the interaction of the fluid contents with the blade 118.

The blade 118 is specifically designed to have "negative feedback" with the contents of the main housing 122. If the vortex 306 and 306m and the air pocket 304 and 304m are deep, then the inner arms 202 of the blade 118 sit within the vortex 306 and 306m, offering a greater rotational resistance to the contents of the vortex 306 and 306m. This, in turn, will cause the contents to rotate at a faster rate. This faster rate will cause the contents to "climb" the vessel and as a result, the depth of the vortex 306 and 306m and the air pocket 304 and 304m will be greater.

The increase in depth will result in the inner arms 202 of the blade 118 having increasingly less effect on the contents of the vortex as the air pocket 304 and 304m increases in size and the inner arms 202 are gradually removed from within the vortex 306 and 306m. This results in a reduction in the rotational resistance provided by the inner arms 202 of the blade 118. This reduction in rotational resistance will result in a reduction in rotational speed of the contents of the vortex 306 and 306m. This reduction in rotational speed will cause the vortex 306 and 306m to "fall down" the sides of the main housing 122 causing a reduction in the size of the air void 304 and 304m and an increase in the portion of the inner arms 202 that sit within the vortex 306 and 306m. This increase in the portion of the inner arms 202 to sit within the vortex 306 and 306m causes an increase in rotational resistance which causes an increase in rotational speed of the content which causes the contents of the main housing 122 once more "climb" the inner surface 322 of the main housing 122.

This can result in instability if a standard motor drive were used, which would manifest as a large variation in RPM (rotations per minute) of the motor as the motor experiences a wide variation in rotational resistance.

An active electronic feedback speed control mechanism may be incorporated. The electronic feedback mechanism constantly monitors the rpm of the blade and compares this to a reference value. Any difference with respect to this reference value results in corrective action to minimize the difference, thus maintaining the reference speed. This is achieved using a PID (proportional-integral-derivative) controller.

Figure 5A:
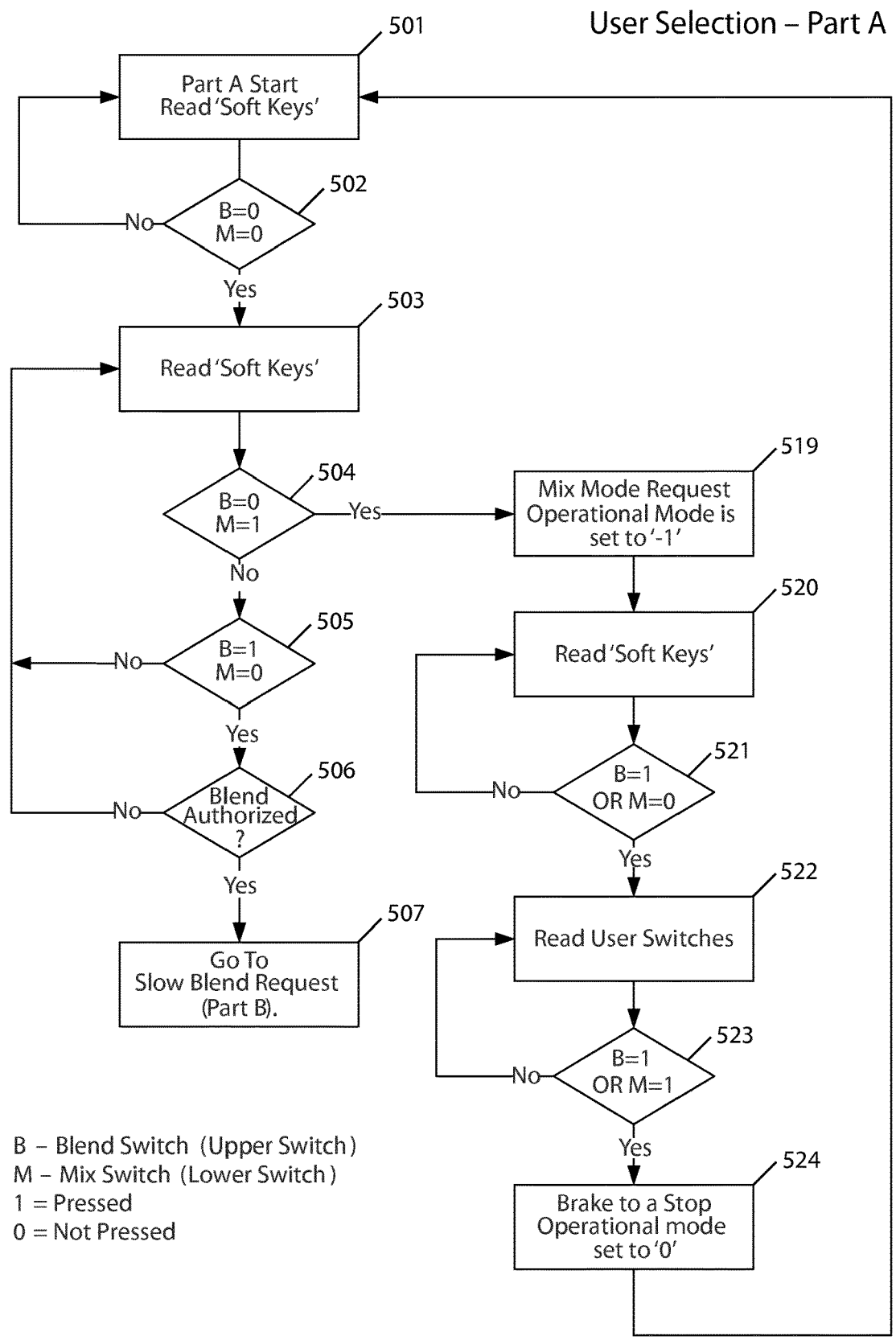
FIG. 5a depicts a flow diagram of the processes involved in controlling the blender to switch between mix, blend and deactivation modes, in accordance with the present invention.
Figure 5B:
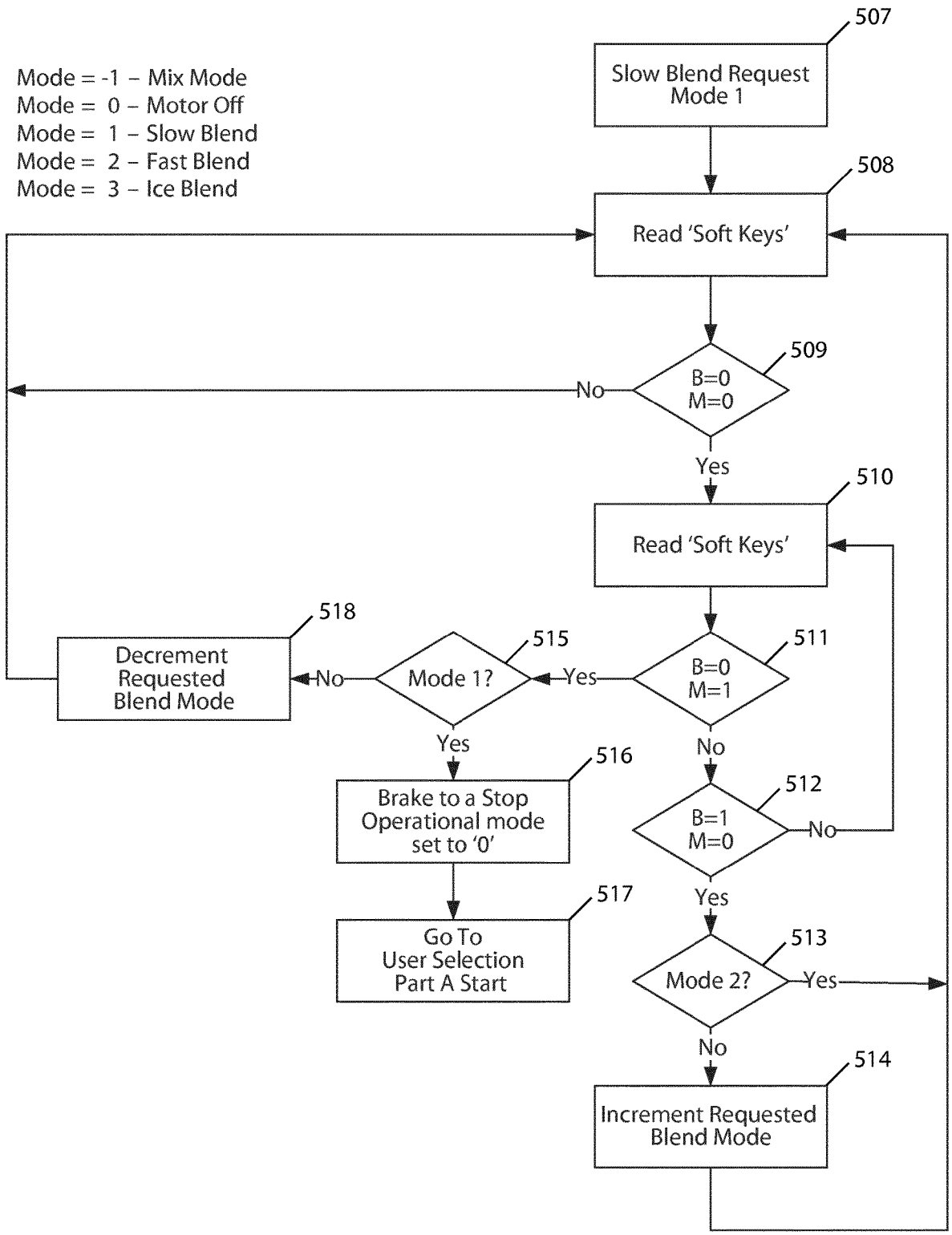
FIG. 5b depicts a flow diagram of the processes involved in controlling the blender once a slow blend request has been initiated, in accordance with the present invention.
Figure 5C:
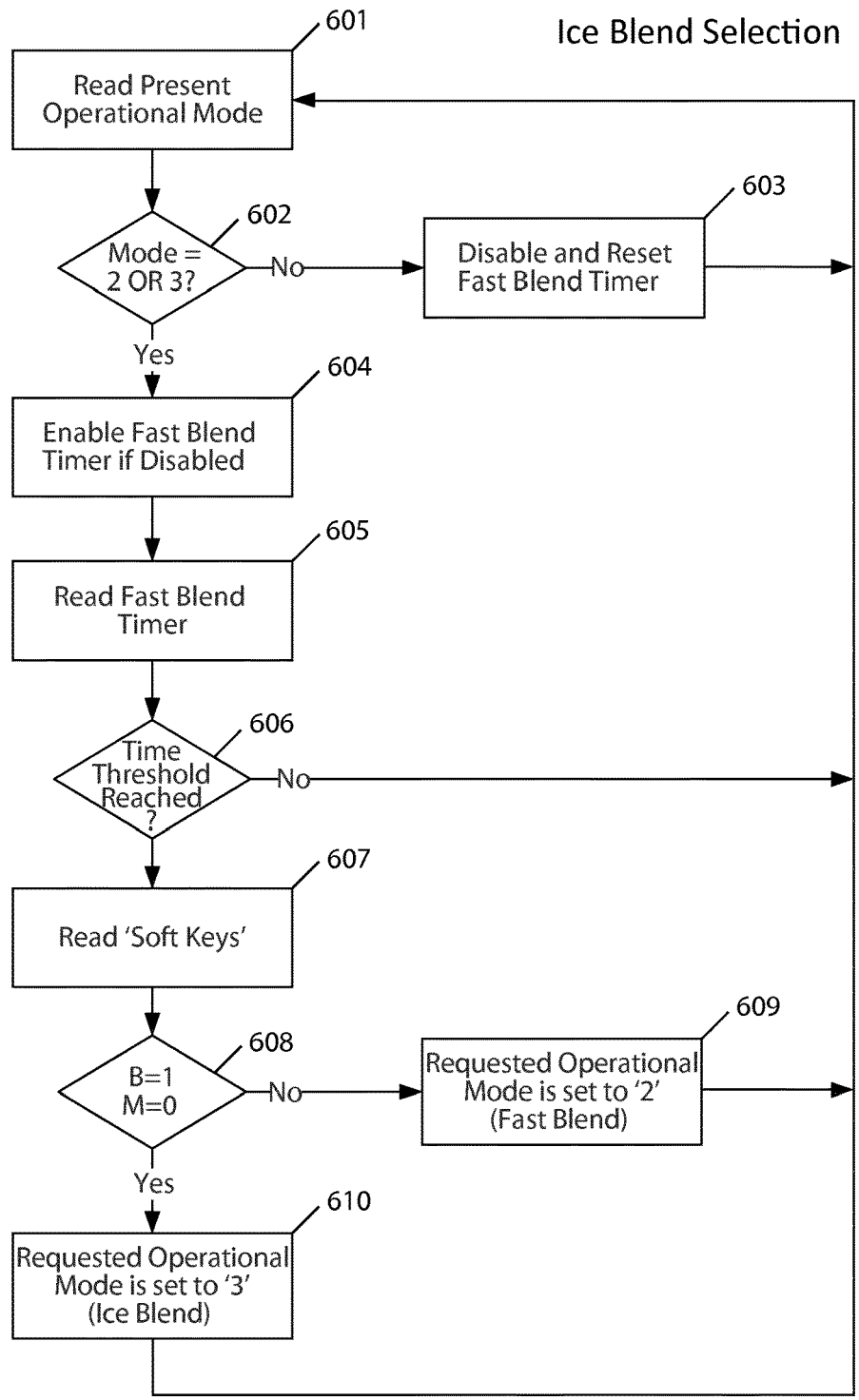
FIG. 5c depicts an ice blend selection process flow diagram, in accordance with the present invention.

FIGS. 5a to 5c depict process flow diagrams of processes carried out at the controller 108. FIGS. 5a to 5c detail how a user of the blender 100 can change between three different blending modes, a mixing mode and deactivation of the blender 100 using only the lower 'mix' button 110 and the upper 'blend' button 112 shown in FIG. 1.

FIG. 5a depicts a flow diagram of the processes involved in controlling the blender 100 to switch between mix, blend and deactivation modes. The depicted process is carried out at the controller 108.

At step 501, the process starts and the buttons 110 and 112 are read by the controller 108.

At step 502, the controller 108 determines whether either of the lower and upper buttons 110 and 112 are pressed. If one or more of the buttons 110 and 112 is pressed, step 501 is repeated. If neither of the lower and upper buttons 110 and 112 is pressed, the process moves onto step 503.

The purpose of steps 501 and 502 is to ensure that the initial state of both buttons, i.e. unpressed, is known. Without this check, incorrect behavior would result.

At step 503, the lower and upper buttons 110 and 112 are read again.

At step 504, the controller 108 determines whether the mix button 110 has been pressed and whether the blend button 112 has remained unpressed. If this is the case, a mix request is initiated at step 519. If the mix button 110 has not been pressed, step 505 is performed.

At step 505, the controller 108 determines whether or not the blend button 112 has been pressed. If the blend button 112 has not been pressed, step 503 is repeated. If the blend button 112 has been pressed, step 506 is performed.

At step 506, the controller 108 determines whether a blending operation has been authorized (to be described in detail below). If a blending operation has not been authorized, step 503 is repeated. If a blending operation has been authorized, a slow blend request is made at step 507.

Looking back at step 504, if the lower button 110 has been pressed and a mix request has been initiated at step 519, the blender 100 will enter a mix mode and begin to perform a mixing operation, wherein the blade 118 is rotated in a clockwise direction with the speed (i.e. rpm) of the motor 106 being set at a suitable level for the purposes of mixing the fluid contents of the blender 100, in line with the mixing processes discussed above.

The mix mode is for performing an efficient mix of the contents of the blender 100 in a reasonable time using relatively low power levels (i.e. within the range of 30 to 55 watts, typically in the region of 45 watts) and generating only low levels of localized fluid pressure and shear force thereby minimizing the risk of mechanically or thermally damaging solid constituents. With respect to solid protein constituents this means largely preserving the proteins quaternary structure (the arrangement of multiple folded protein or coiling protein molecules). The rpm of the motor 106 for a mix mode may be in the range of 3,000 to 5,000 rpm, typically 4,000 rpm.

At step 520, once the mixing operation is underway, the mix button 110 and blend button 112 are read again by the controller 308. At step 521, the controller 108 determines whether the blend button 112 has been pressed or whether the mixing button 110 has been released. If neither of these is the case, step 520 is repeated. If either the blend button 112 has been pressed or the mix button 110 has been released, step 522 is performed.

At step 522, the buttons 110 and 112 are read again.

At step 523 the controller 108 determines whether the blend button 112 has remained pressed, has been pressed again or whether the mixing button 110 has been pressed again once released. If any of these scenarios are true, the controller 108 controls the motor 106 to cease rotation of the blade, ending the mixing operation and deactivating the blender at step 524. If none of these are true, step 522 is repeated.

Once step 524 has been completed, step 501 occurs once more.

The blender 100 is capable of performing three different blending modes. These modes are a slow blend mode, a fast bend mode and an ice blend mode. The speed of the motor 106 is lowest when the blender 100 is in the slow blend mode and highest when in the ice blend mode. The speed of the motor 106 when the blender 100 is in the fast blend mode is in between that of the slow blend mode and the ice blend mode. All three modes are suitable for performing a blending operation.

The slow blend mode is for performing a blend at relatively low power (i.e. within the range 60 and 120 watts, but this can be much higher with heavier loads) with a low energy consumption (typically between 700 and 1100 Joules for a slow blend), enabling the user to add constituents whilst the mixer is in operation, minimizing the risk of loss of constituents as they are added. Fluid of increasing rotational velocity naturally forms a deepening vortex. If the rotational speed of the fluid is high it may climb the walls of the main container and reach its apex, resulting in fluid loss. The rpm of the motor 106 in the slow blend may be within the range of 6,000 to 9000 rpm, typically 7,000 rpm.

The fast blend mode is for performing an efficient blend of most soft contents, with the lid in place. The blend should be complete in a reasonable time (e.g. around 7 to 16 seconds) while with a low energy consumption (typically between 800 and 1200 Joules). For a fast blend, the power level is typically between 100 and 150 watts, but can be much higher with heavier loads. The rpm of the motor 106 in the fast blend may be in the range of 10,000 to 14,000 rpm typically 11,000 rpm.

The ice blend mode is for performing a high performance blend suitable for breaking down solid contents including ice which requires a high blade tip speed. The energy used per blend will be higher than that required for a fast blend. The rpm of the motor 106 in the ice blend mode may be in the range of 15,000 to 20,000 rpm, typically 16,000 rpm.

FIG. 5b depicts a flow diagram of the processes involved in controlling the blender 100 once a slow blend request has been initiated at step 507. The depicted process is carried out at the controller 108. Once the request has been initiated the blender 100 enters a slow blend mode, wherein the blade 118 is rotated in an anticlockwise direction with the speed of the motor 106 being controlled to a level appropriate for performing a blending operation. Once the blender 100 is in a slow blend mode, the mixing and blend buttons 110 and 112 are read again at step 508.

At step 509, the controller 108 determines whether both of the mix button 110 and the blend button 112 are unpressed. If this is not case, step 508 is repeated. If both buttons 110 and 112 are unpressed, the buttons are read again at step 510.

At step 511, once the buttons have been read again at step 510, the controller 108 determines whether the blend button 112 is unpressed and the mix button 110 is pressed. If this is not the case, step 512 is performed. If this is the case, step 515 is performed.

At step 512, the controller 108 determines whether the blend button 112 is pressed as the mix button 110 is unpressed. If this not the case, step 510 is repeated. If this is the case, step 513 is performed.

At step 513, the controller 108 determines whether the device is in the fast blend mode. If the blender 100 is in the fast blend mode, at which the motor 106 is operated at a higher speed than the slow blend mode, step 508 is repeated. If the blender 100 is not in the fast blend mode, i.e. where the blender 100 is in the slow blend mode, step 514 is performed.

At step 514, an increment is requested and the blender 100 transitions from the slow blend mode to the fast blend mode.

Looking back at step 511, if the blend button 112 is unpressed and the mix button 110 is pressed, step 515 is performed. At step 515, the controller 108 determines whether the blender 100 is in the slow blend mode. If the blender is in the slow blend mode, step 516 is performed.

At step 516, the controller 108 switches off the motor. Subsequently, step 517 is performed which restarts the process control at step 501.

If, at step 515, the blender 100 is not in the slow blend mode, step 518 is performed.

At step 518, a decrement request is initiated and the blend mode is changed to a lower speed blend mode and, subsequently, step 508 is performed again.

FIG. 5c depicts an ice blend selection process flow diagram of a process carried out at the controller 108. This process flow runs concurrently with the user selection process flows shown in FIGS. 5a and 5b.

At step 601, the current operational mode of the blender 100 is read.

At step 602 the controller 108 identifies whether the present operational mode of the blender 100 is one of a fast blend mode and an ice blend mode. If the blender 100 is not in one of these modes, step 603 is performed. If the blender 100 is in one of these modes, step 604 is performed.

At step 603, a dedicated fast blend timer is disabled and reset.

At step 604, if the blender 100 is in either of the fast blend mode and the ice blend mode, the dedicated fast blend timer is enabled, if disabled, which starts timing how long it has been since entering either of the fast blend mode and the ice blend mode.

At step 605, the timer is read and compared with a predetermined threshold time.

At step 606, the controller 108 determines whether the threshold time has been reached. If it has not been reached, step 601 is repeated. If it has been reached, step 607 is performed.

At step 607, the blend and mix buttons 112 and 110 are read.

At step 608, the controller 108 determines whether the blend button 112 is pressed and the mix button 110 is not pressed. If this is not the case, step 609 is performed. If this is the case, step 610 is performed.

At step 609, the operational mode of the blender 100 is set to fast blend mode and step 601 is repeated.

At step 610, the operational mode of the blender 100 is set to the ice blend mode and step 601 is repeated.

The effect of the process represented in FIG. 5c is that a user of the blender 100 can enter the ice blend mode by holding down the blend button 112 when the blender 100 is in the fast blend mode. The blender 100 will then stay in the ice blend mode until the blend button 112 is released by the user, at which point the blender 100 will drop back into the fast blend mode. The fast blend timer serves to prevent passage into the ice blend mode for a short period. This period may be 2 seconds. This gives the user time to remove his or her finger form the button should ice blend not be required.

Figure 6:
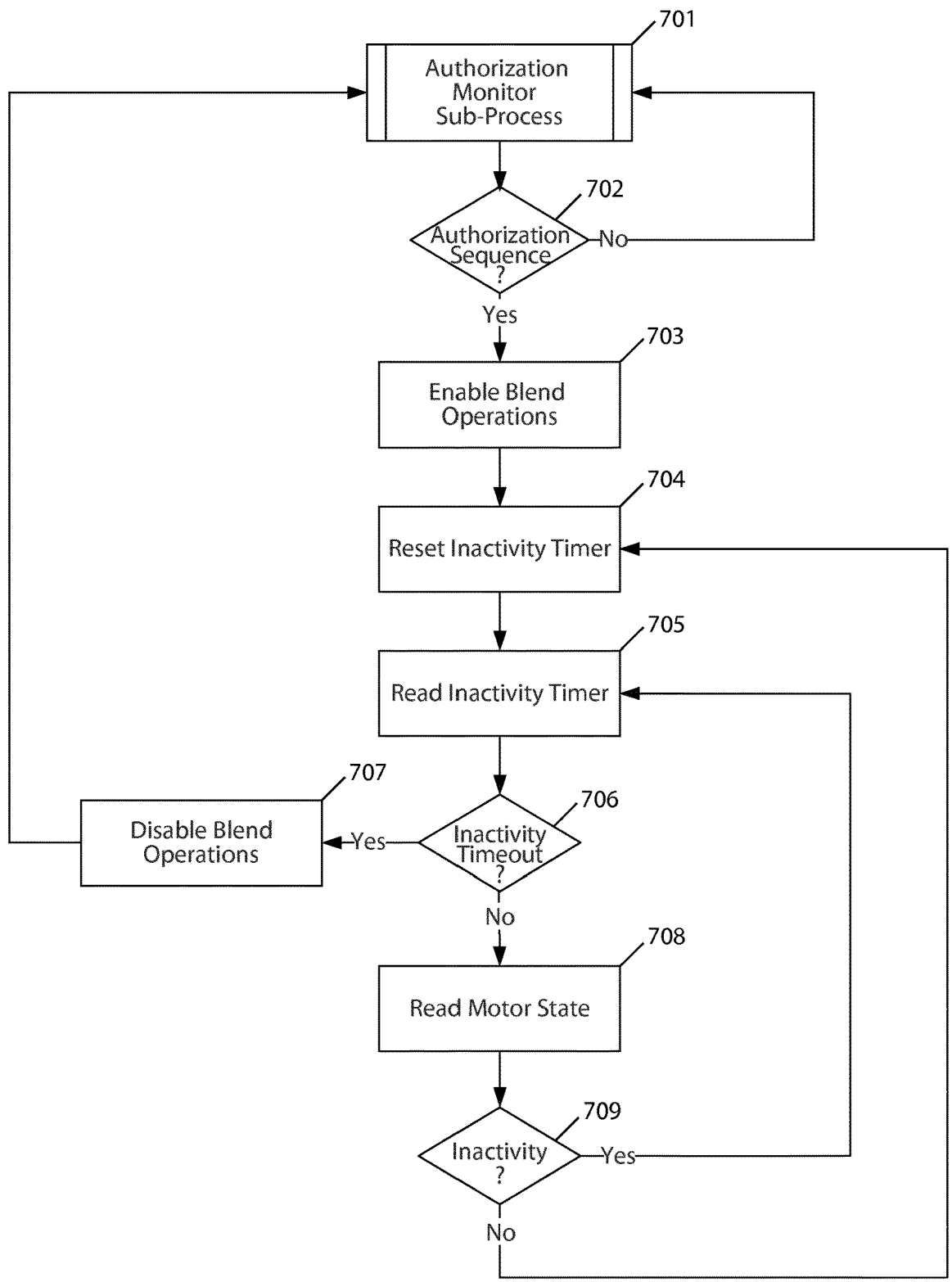
FIG. 6 depicts a blend authorisation process flow diagram, in accordance with the present invention.

FIG. 6 depicts a blend authorization process flow diagram of a process carried out at the controller 108. When this process is implemented, the user is required to enter a security sequence to authorize the blender 100 to perform blend operations. After a period of inactivity, the blender 100 will automatically de-authorize itself.

At step 701, the flags indicating the results of an allied authorization sub-process, which interprets any presses of the blender 100's mix button 110 and blend button 112, are read by the controller 108.

The authorization sub-process is active when the blender 100 is not authorized to perform a blend. This process, when active, monitors all aspects of the users key presses, which includes duration pressed, and key sequence. This process determines when the pattern and duration of user key presses meets an internally defined set of criteria, and at this point will set a flag indicating that an approved sequence has been entered and declare a result is ready. Any key press that is interpreted as not being part of a correct authorization sequence, or not part of normal operation in mix mode, will be interpreted as an authorization failure.

At step 702, if a result has been declared by the authorization allied-sub process and the correct authorization flag is set, step 703 is performed, otherwise step 701 is repeated.

At step 703, a flag is set which, when set, enables blend operations to be carried out by the blender 100.

At step 704, an inactivity timer is reset.

At step 705, the inactivity timer value is read.

At step 706, the inactivity timer value is compared with a timeout value. If the timeout value has been met, step 707 is carried out. If the timeout value has not been met, step 708 is carried out.

At step 707, the flag which enables blend operations is cleared and step 701 is repeated.

At step 708, the state of the motor 106 is read.

At step 709, the controller 108 determines whether the motor 106 is in an active or an inactive state. If the motor 106 is in an active state, step 704 is repeated and the inactivity timer is reset. If the motor 106 is in an inactive state, step 705 is repeated and the inactivity timer is read.

The effect of the process represented in FIG. 6 is that a user of the blender 100 is required to enter a security sequence before any blending operation is carried out by the blender 100. Further, once a security sequence has been correctly entered, the blender will automatically de-authorize itself after a timeout period of inactivity has elapsed.

Figure 7:
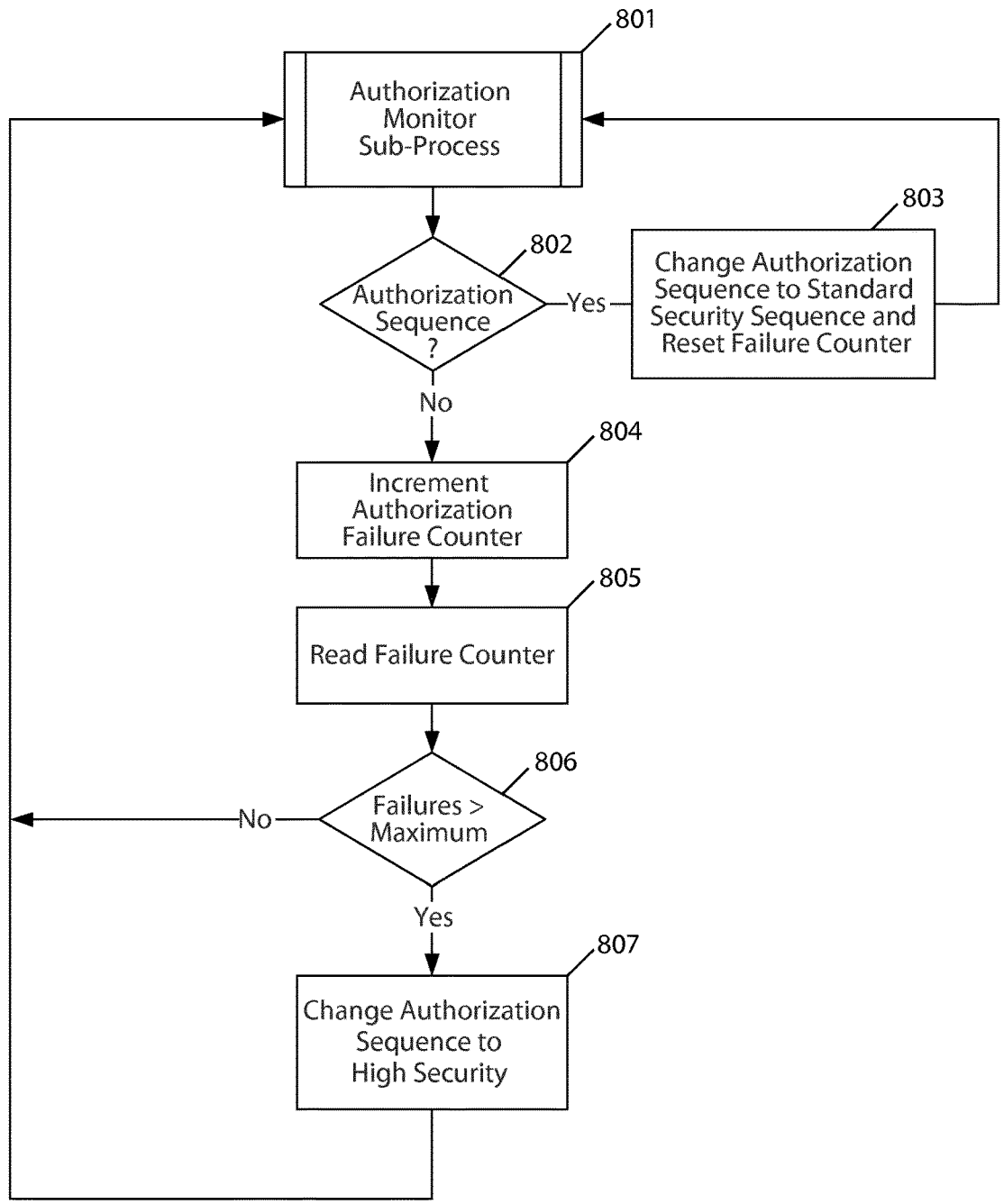
FIG. 7 depicts a blend authorisation sequence security level process flow diagram, in accordance with the present invention.

FIG. 7 depicts a blend authorization sequence security level process flow diagram of a process carried out at the controller 108. The process makes use of an 'authorization failure counter' and a specific authorization sequence with two settings, 'standard security' and 'high security'.

A standard security authorization sequence is one in which few key presses are required to achieve authorization. A sequence may for example consist of 6 key presses as follows. While the mix button 110 is pressed, the blend button 112 is pressed 3 times in quick succession. On the third depression the blend button 112 remains depressed while the mix button 110 is pressed twice in quick succession. The blend button 112 is then quickly released. This is a simple sequence which would not require much effort on the part of the user.

With a time frame requirement added to the sequence, for example a limit of 0.5 seconds between 'quick succession' key presses and a limit on the number of attempts, it is highly unlikely that a child would hit on a valid sequence at random. Any key press that is interpreted as not being part of a correct authorization sequence, or not part of normal operation in mix mode, will be interpreted as an authorization failure by the allied sub-process.

A high security authorization sequence is one which involves a larger number of key presses, in a more complex sequence. This has a higher associated security but requires more effort on the part of the user to input. A requirement to input this sequence for blend authorization would only exist after a set number of failures to enter the standard security sequence.

When implemented, the process reduces the risk of the blender 100 being authorized to perform a blending operation by a user guessing the authorization sequence. The process flow runs concurrently with the blend authorization process flow shown in FIG. 6.

At step 801, the flags indicating the results of an allied sub-process, which interprets any presses of the blender's mix button 110 and blend button 112, are read by the controller 108 for results.

At step 802, if a result has been declared by the allied-sub process and the correct authorization flag is set, step 803 is performed, otherwise step 804 is performed.

At step 803, where the correct authorization sequence has been entered at step 802, the specific authorization sequence is set to 'standard', irrespective of whether it is set to the 'standard security' or 'high security' setting at the time, and the authorization failure counter is set to zero.

At step 804, where an incorrect authorization sequence has been entered at step 802, the authorization failure counter is incremented.

At step 805, the authorization failure counter is read.

At step 806, the controller 108 determines whether the value of the authorization failure counter exceeds a maximum value. The maximum value may be three. If the maximum value has not been reached, step 801 is repeated. If the maximum value has been reached, step 807 is performed.

At step 807, the specific authorization sequence is set to high security and step 801 is repeated.

The effect of the process represented in FIG. 7 is that a user of the blender 100 is only able to enter an incorrect specific authorization sequence a limited number of times. Each time an incorrect sequence is entered, the authorization failure counter is incremented and, once a predetermined value has been reached, the security setting is switched to a high security setting.

Figure 8:
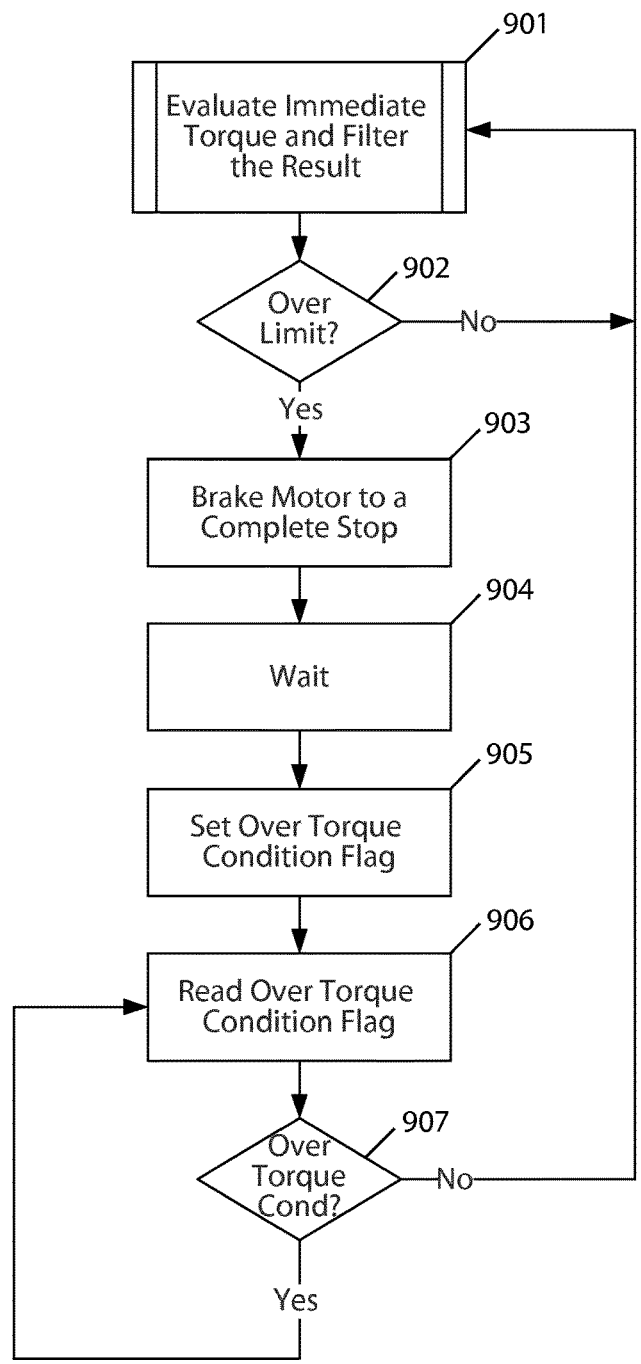
FIG. 8 depicts a mix mode torque limiter process flow diagram, in accordance with the present invention.

FIG. 8 depicts a mix mode torque limiter process flow diagram of a process carried out at the controller 108. When implemented, the process prevents excessive torque from being generated in the event that motion of the blade is interrupted.

At step 901, an immediate torque value is determined, wherein determining immediate torque value comprises: receiving a torque value and optionally, filtering the value to remove any noise.

The noise originates mainly from the motor's underlying electrical processes which are necessary for its operation. Typically, the measured torque will fluctuate synchronously with rotation of the shaft. Filtering out this fluctuation will yield more dependable operation.

At step 902, the value is then compared with a pre-defined torque limit (e.g. in the region of 0.1 Nm). If the value is less than the limit, step 901 is repeated and, if the value exceeds the limit, step 903 is carried out.

At step 903, the motor 106 of the blender 100 is braked. The motor may be slowed down or may be braked to a complete stop.

At step 904, a pre-defined period of waiting time is allowed to elapse. During this time, no other process can attempt to restart the motor 106.

At step 905, after the pre-defined period of waiting time has elapsed, an over torque condition flag is set to indicate that the pre-defined torque limit has been exceeded. The over torque condition flag is cleared by any attempt to restart the motor 106, for example, as happens when the blender 100 is set to 'mix mode' (see step 519 above).

At step 906, the over torque condition flag is read.

At step 907, the result of the reading of the over torque condition flag is used to determine whether or not the over torque condition flag is still set. If it is still in place, step 906 is repeated. If the flag has been cleared, step 901 is repeated.

Figure 9:
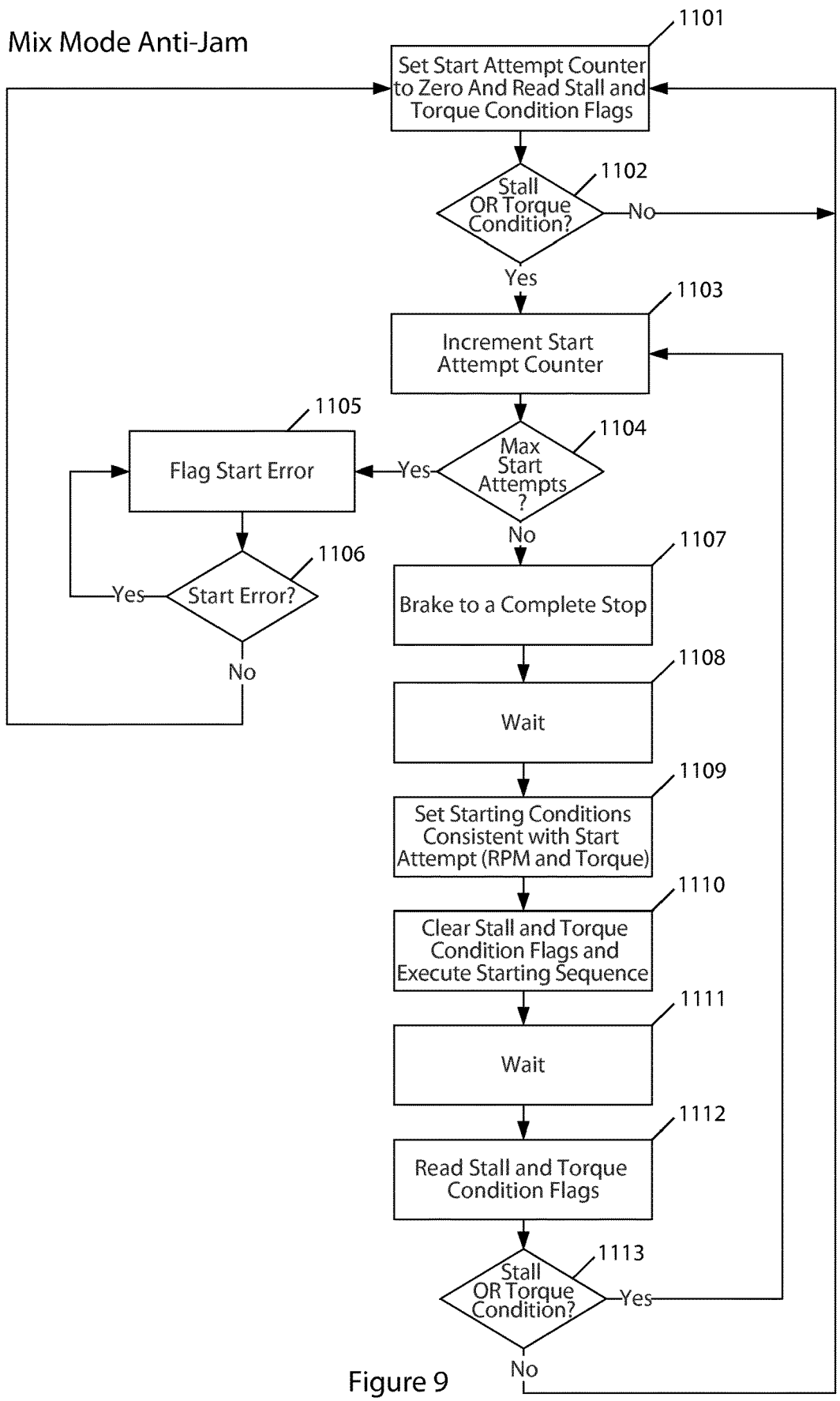
FIG. 9 depicts a mix mode anti-jam process flow diagram, in accordance with the present invention.

FIG. 9 depicts a mix mode anti-jam process flow diagram of a process carried out at the controller 108. When implemented, the process dictates how the blender 100 responds to a detected stall condition of the motor 106 during the mix mode of operation of the blender 100. A stall condition is a condition that is declared if vital feedback information from the motor is not received within a given time period. This is generally caused by the motors shaft failing to rotate.

When the process is implemented, the blender 100 will attempt to resume normal operation after a stall by initiating a potential series of high torque restarts with the blade 118 rotating in the same direction as during the mixing mode of operation. At each restart the target rpm and initiating torque may vary.

There is an emphasis on safety when operating in 'mix' mode as no authorization is required to enter this mode. As such, the blender 100 must not be allowed to recover from a blade jam by exercising high torque maneuvers in both rotational directions. Although this would be an efficient means for blade jam recovery, it could also be potentially dangerous if the blade were to move in the anticlockwise (sharp leading edge) direction.

As such, blade jam recovery is restricted to the clockwise (blunt leading edge) direction only. Delays will be longer than in the blend mode anti-jam process flow detailed below, allowing objects blocking rotation, for example fingers, to be retracted. The operation of the mix mode anti-jam process flow is otherwise the same as for the below described blend mode anti-jam process flow.

The process makes use of a 'start attempt counter'.

At step 1101, the start attempt counter is set to zero and a stall flag is read.

At step 1102, the controller 108 determines whether a stall has occurred or a torque condition has occurred based on their respective flag reading. If the respective flags indicate that neither a stall nor a torque condition has occurred, step 1101 is repeated. If the stall flag indicates that a stall has occurred, step 1103 is carried out.

At step 1103, the start attempt counter is incremented.

At step 1104, the value of the start attempt counter is compared with a maximum allowable value. If the maximum allowable value has been reached, step 1105 is carried out. If the maximum allowable value has not been reached, step 1107 is carried out. The maximum allowable value may be three start attempts.

At step 1105, an error flag is set and restart attempts are aborted.

At step 1106, the controller 108 determines whether the error flag is still in place. If the error flag is still in place, step 1105 is repeated. If the error flag has been cleared, for example by an allied process which runs concurrently, step 1101 is repeated.

Many processes run concurrently on the controller 108. Once a start error has been set/flagged by the mix mode anti-jam process it will effectively sit and wait. The blender 100 motor is inactive at this point and will not activate without input from the user. The user input selection process flow is reset to the start point 501. All other operational flags including blend authorization will remain unaltered. Operation of the blender 100 from this point will be determined by the user selection process flow. Another attempt to start would only take place if initiated by the user selection process.

At step 1107, a motor brake is applied to ensure that the motor 106 has come to a complete halt.

At step 1108, a first pre-defined period of waiting time is allowed to elapse.

At step 1109, after the first pre-defined period of waiting time, the starting conditions (i.e. rpm and initiating torque) applicable to the particular starting attempt count are applied.

The starting conditions relate to rpm, rotational direction and torque only. For mix mode the torque would typically be set to 0.1 Nm, the rotation set to clockwise and the rpm set to 4000.

At step 1110, the stall and or torque condition flags are cleared and a motor start sequence is initiated, consistent with the starting conditions applied in step 1109.

The torque condition flag is set when an over-torque condition has occurred. This invariably results in the motor being braked to a stop. Start attempts could have been initiated by either a stall condition or torque condition and so it is important to clear both flags at this stage.

At step 1111, a second pre-defined period of waiting time is allowed to elapse.

At step 1112, after the second pre-defined period of waiting time, the stall condition and torque condition flags are read.

At step 1113, the controller 108 determines whether a stall has occurred based on the stall flag reading. If the stall flag indicates that a stall has occurred, step 1103 is repeated. If the stall flag indicates that a stall has not occurred, step 1101 is repeated.

Figure 10:
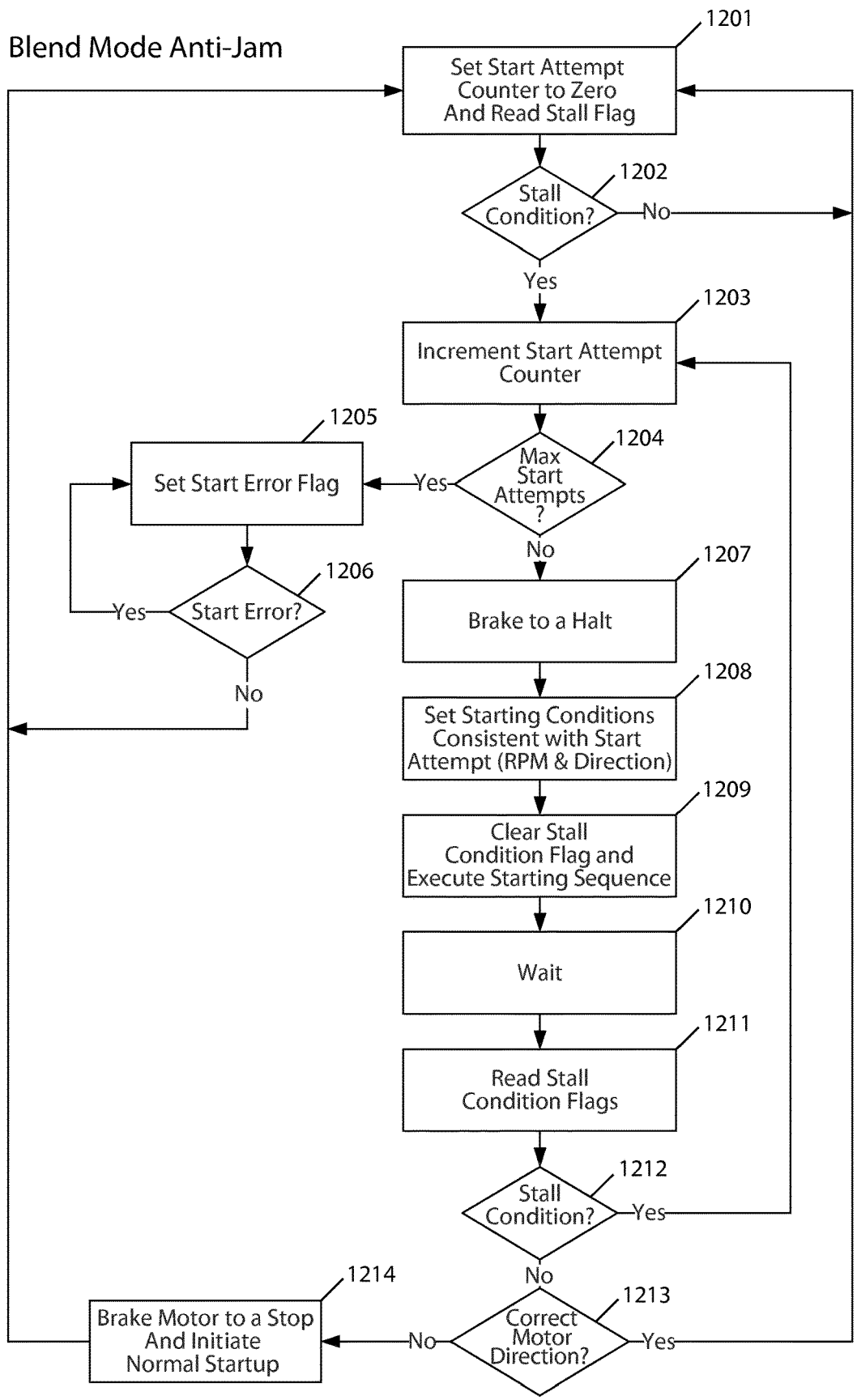
FIG. 10 depicts a blend mode anti-jam process flow diagram, in accordance with the present invention.

FIG. 10 depicts a blend mode anti-jam process flow diagram of a process carried out at the controller 108. When implemented, the process dictates how the blender 100 responds to a detected stall condition of the motor 106 during the blend mode of operation of the blender 100. A stall condition is a condition that is declared if vital feedback information from the motor is not received within a given time period. This is generally caused by the motors shaft failing to rotate.

When the process is implemented, the blender 100 will attempt to resume normal operation after a stall by initiating a potential series of high torque restarts in opposing directions. At each restart the target rpm, motor rotation direction and initiating torque are varied.

The process makes use of a 'start attempt counter'.

At step 1201, the start attempt counter is set to zero and a stall flag is read.

At step 1202, the controller 108 determines whether a stall has occurred based on the stall flag reading. If the stall flag indicates that a stall has not occurred, step 1201 is repeated. If the stall flag indicates that a stall has occurred, step 1203 is carried out.

At step 1203, the start attempt counter is incremented.

At step 1204, the value of the start attempt counter is compared with a maximum allowable value. If the maximum allowable value has been reached, step 1205 is carried out. If the maximum allowable value has not been reached, step 1207 is carried out. The maximum allowable value may be three start attempts.

At step 1205, an error flag is generated and restart attempts are aborted.

At step 1206, the controller 108 determines whether the error flag is still in place. If the error flag is still in place, step 1205 is repeated. If the error flag has been cleared, for example by an allied process (such as user selection process shown in FIGS. 5a and 5b), step 1201 is repeated.

At step 1207, a motor brake is applied to ensure that the motor 106 has come to a complete halt.

At step 1208, the starting conditions (i.e. rpm and direction of rotation) applicable to the particular starting attempt count are applied.

At step 1209, the stall condition flag is cleared and a motor start sequence is initiated, consistent with the starting conditions applied in step 1208.

During each start reattempt of the motor start sequence, the direction of the blade may be reversed in an attempt to free the blade.

At step 1210, a pre-defined period of waiting time is allowed to elapse.

At step 1211, after the pre-defined period of waiting time, the stall condition flag is read.

At step 1212, the controller 108 determines whether a stall has occurred based on the stall flag reading. If the stall flag indicates that a stall has occurred, step 1203 is repeated. If the stall flag indicates that a stall has not occurred, step 1213 is carried out.

At step 1213, a check is made as to the motor's direction of rotation. If the motor 106 is travelling in the correct direction (e.g. counter clockwise), step 1201 is repeated. If the motor 106 is not travelling in the correct direction, step 1214 is carried out.

At step 1214, a motor brake is applied to ensure that the motor 106 has come to a complete halt and the motor 106 is restarted in the correct direction and normal operation resumes.

Figure 11:
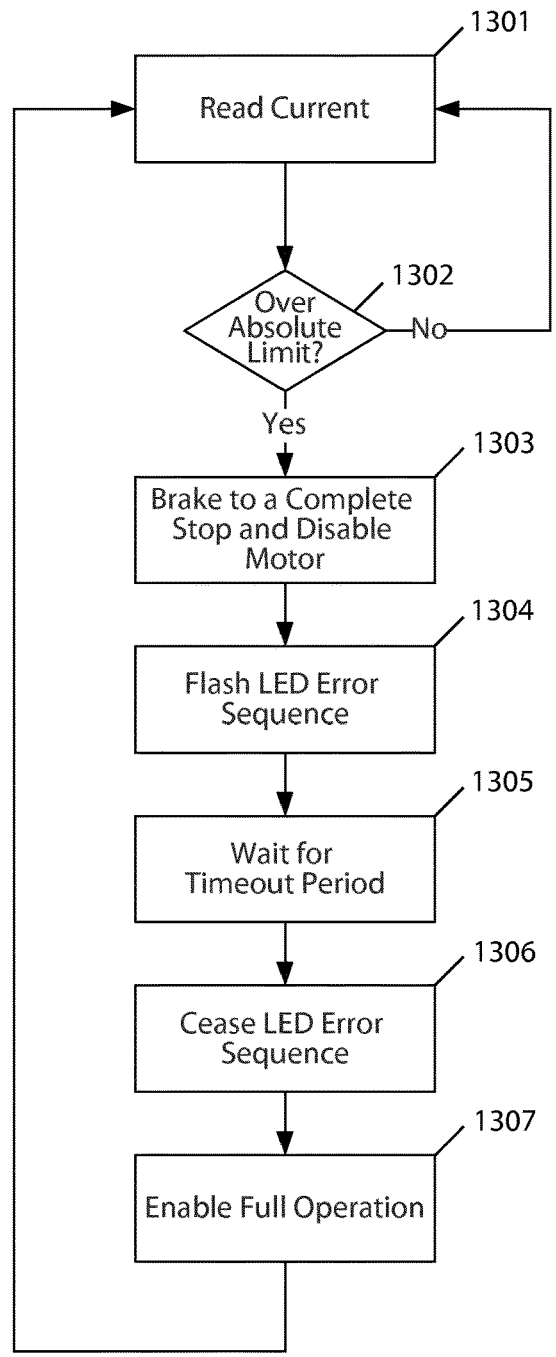
FIG. 11 depicts a current monitor process flow diagram, in accordance with the present invention.

FIG. 11 depicts a current monitor process flow diagram of a process carried out at the controller 108. The current taken from the battery powering the blender 100 is prevented from reaching a pre-defined absolute limit by a linear control loop embodied by the current monitor process which limits the current draw from the battery. It is included as a safety feature.

At step 1301, a reading of the current taken from the battery powering the blender 100 is taken at a high repetition rate and the reading is received at the controller 108. This high repetition rate is variable during operation and anywhere between 16,000 and 128,000 times a second.

At step 1302, the current reading is compared with a pre-defined absolute limit (typically set to around 35 A). If the absolute limit is exceeded, step 1303 is carried out. If the absolute limit is not exceeded stem 1301 is repeated.

At step 1303, a motor brake is applied to ensure that the motor 106 has come to a complete halt and the motor is disabled, i.e. no other process would be able to start the motor, including that which relates to user input.

At step 1304, a flashing LED sequence is initiated to indicate to a user of the blender 100 that an error has occurred. The LED may be disposed on the motor housing 102 or the main housing 122 of the blender 100 such that it is visible to the user.

At step 1305, a pre-defined timeout period is allowed to elapse.

At step 1306, after the timeout period has elapsed, the flashing LED sequence is ceased.

At step 1307, full operation of the motor is enabled and step 1301 is repeated.

Steps 1306 and 1307 may be performed in any order and may also occur simultaneously.

Figure 12:
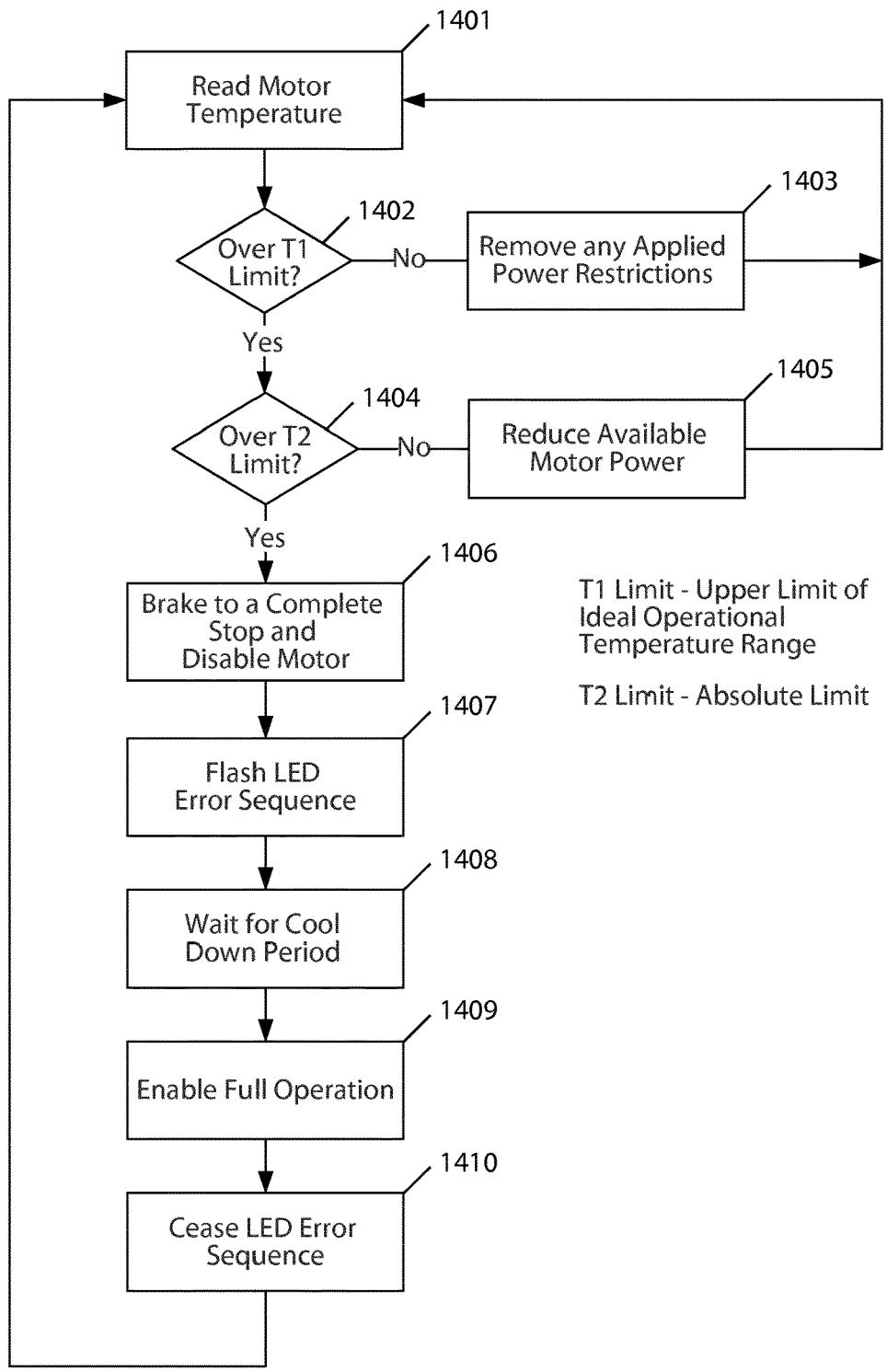
FIG. 12 depicts a temperature monitor process flow diagram, in accordance with the present invention.

FIG. 12 depicts a temperature monitor process flow diagram of a process carried out at the controller 108. The process prevents the operational temperate of the blender 100 from exceeding a pre-defined absolute limit. The process makes use of two pre-defined temperature limits. The 'T1' limit represents the upper limit of the ideal operational temperature range. The 'T2' limit is the absolute limit.

At step 1401, the temperature of the motor 106 is read. This may involve receiving a temperature reading from a temperatures sensor at the controller 108.

At step 1402, the temperature reading is compared with a pre-defined upper limit of the ideal operational temperature range, 'T1'. If the upper limit is not exceeded stem 1403 is repeated. If the upper limit is exceeded, step 1404 is carried out.

At step 1403, any power restrictions applied to the blender 100 are removed and step 1401 is repeated.

At step 1404, the temperature reading is compared with a pre-defined the absolute limit, 'T2'. If the absolute limit is not exceeded stem 1405 is repeated. If the absolute limit is exceeded, step 1406 is carried out.

At step 1405, power restrictions are applied to the blender 100 in an attempt to avoid the temperature form rising any further and step 1401 is repeated.

At step 1406, a motor brake is applied to ensure that the motor 106 has come to a complete halt.

At step 1407, a flashing LED sequence is initiated to indicate to a user of the blender 100 that an error has occurred. The LED may be disposed on the motor housing 102 or the main housing 122 of the blender 100 such that it is visible to the user.

At step 1408, a pre-defined cool down period is allowed to elapse.

At step 1409, after the cool down period has elapsed, full operation of the motor 106 is enabled.

At step 1410, the flashing LED sequence is ceased and step 1401 is repeated.

Steps 1409 and 1410 may be performed in any order and may also occur simultaneously.

Figure 13:
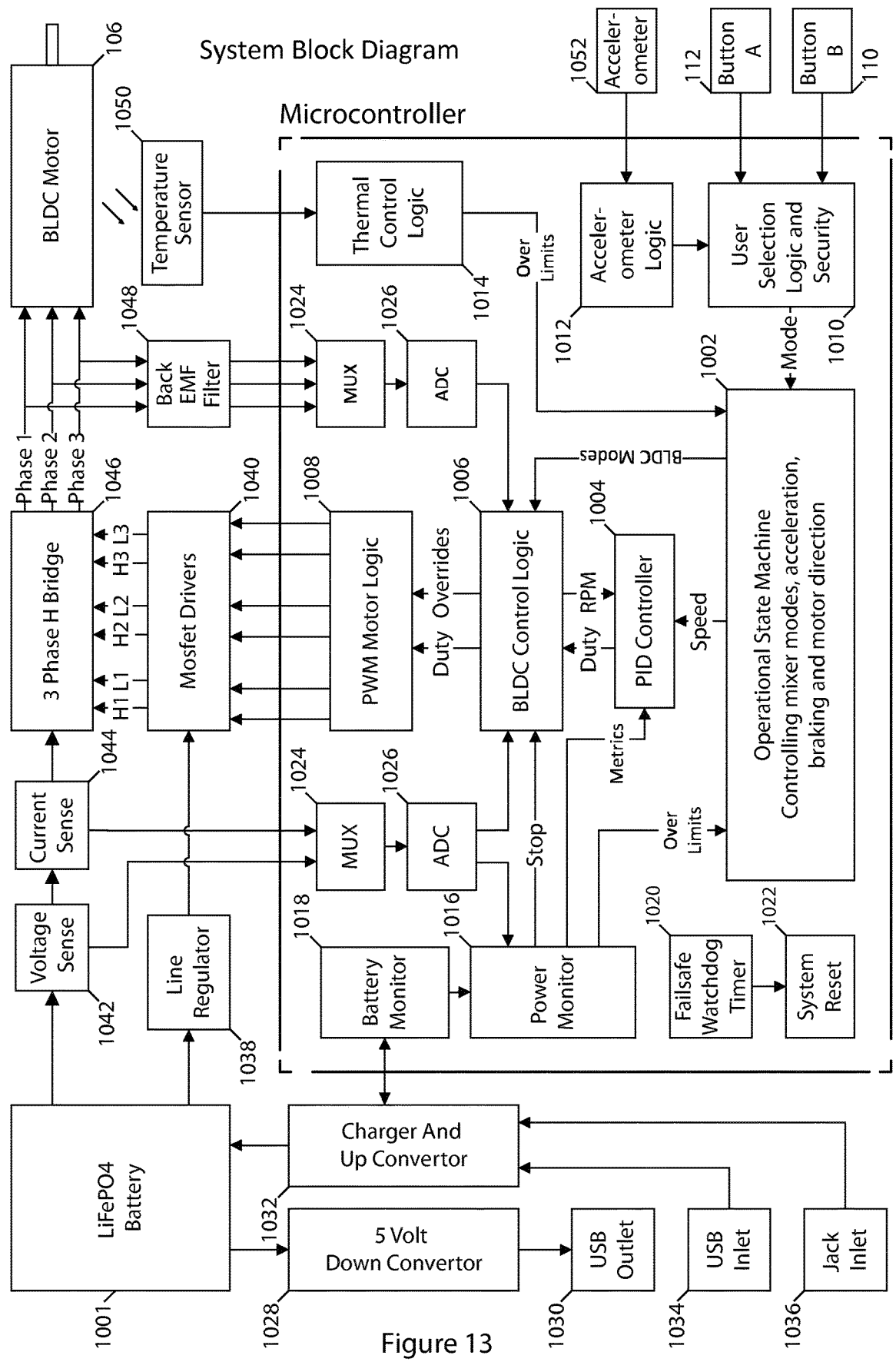
FIG. 13 depicts a block diagram of hardware and software components of an example controller suitable for use in the blender of the present invention; and, FIG. 14 depicts a control loop diagram which illustrates the mathematical processes which determine power delivery to the motor, in accordance with the present invention.

FIG. 13 depicts a block diagram of hardware and software components of an example controller 108c suitable for use in the blender 100 and suitable for carrying out the processes described herein. Also depicted are a motor 106, a battery 1001, both suitable for use in the blender 100, and various other hardware and software components. An explanation of each of the depicted components is provided below.

The microcontroller 108c may comprise a microprocessor, its essential resources, and dedicated application specific hardware all residing on one die.

Controller 108 in FIG. 1 may be a printed circuit board on which reside all electronic components. The microcontroller 108c shown in FIG. 13 may exist on one die. The microcontroller 108c along with other electronic hardware may reside on controller 108.

Controller Components

Operational State Machine 1102: A formal software based decision making process by which decisions are dependent on both external measures and the machines internal 'state'.

PID Controller 1004: A proportional-integral-derivative controller. A software based system feedback controller which acts to maintain system stability.

BLDC Control Logic 1006: Brushless DC (BLDC) control logic which interprets motor 106 feedback information to give useful drive information based on current system demands.

PWM Motor Logic 1008: Hardware and pulse width modulation (PWM) based, H Bridge compatible drive logic, which allows efficient BLDC motor control.

User Selection Logic and Security 1010: The logic required to select the appropriate operational mode based on the state of the base unit's external switches and any security sequence which may include accelerometer data.

Accelerometer Logic 1012: Software interpretation of sensor information to produce system relevant information. With one of these fitted the blender 100 its orientation would be known and if it is being dropped, this would also be known. This could be incorporated into the security. For example, authorization could only be granted if the mixer were held in a correct position, e.g. an upright orientation.

Thermal Control Logic 1014: Interpretation of the live temperature information to determine if the operation is within acceptable limits.

Power Monitor 1016: Interprets live supply information to determine if the operation is within acceptable limits. The power monitor has the task of monitoring all aspects that relate to the drain and charge of the unit's battery. For example it will take voltage and current information from the battery and determine if the voltage is too low, the current is too high, or if the power taken from the battery is within the manufacturers burst power allowance. The term 'burst power' is used here to refer to a level of power which is above that allowed for continuous operation but permitted for short intervals. Such an interval could be for example 5 seconds.

Battery Monitor 1018: Software monitoring of the 'state' of the internal battery to produce system relevant information such as 'state of charge', overvoltage detection, and action external convertor 'sleep mode' during periods of inactivity.

Failsafe Watchdog Timer 1020: This is a hardware timer residing on the controller 108 which is periodically reset in software. Failure to reset this timer within its timeout period results in a system reset. The controller 108 is designed to revert to a 'safe state', a state in which there is no associated potential risk of harm to either the user or the system, in the event of a system reset.

System Reset 1022: A system reset is a global reset that applies to all system being capable of being reset. A system reset return the system, including all latches and software registers to a precisely known state of inactivity from where normal operation can be initiated.

MUX 1024: An analogue multiplexer which allows rapid selection of an individual analogue channel from a choice of 2 or more.

ADC 1026: Analogue to digital convertor.

Other Components

LiFePO4 Battery 1001: Lithium iron phosphate battery, also called LFP battery (with "LFP" standing for "lithium ferrophosphate").

5 Volt Down-Convertor 1028: A power electronics stage designed to efficiently convert voltages of greater than 5 volts down to 5 volts for the purpose of USB Supply.

USB Outlet 1030: A full sized USB outlet included in this design for the sole purpose of providing 5 volts of USB power for charging other devices. The battery 1001 may be prevented from discharging down beyond a predetermined point when charging other devices.

Charger and Up-Convertor 1032: A power electronics stage designed to efficiently convert voltages of below the battery voltage to a level suitable for battery charge. Dedicated devices allow fine control of both battery voltage and charge current.

USB Inlet 1034: A micro USB inlet included in this design for the sole purpose of providing a 5 volt supply for battery recharging.

Jack Inlet 1036: A power inlet of proprietary specification for the purpose of providing electrical power for a fast battery recharge.

Line Regulator 1038: Power electronics which regulate the supplied voltage to a specific level.

MOSFET Drivers 1040: A power electronics stage, converting signals from the controller 108 into useful drive for the power metal-oxide-semiconductor field-effect transistor (MOSFETs).

Voltage Sense 1042: Passive analogue circuit which provides the microcontroller with the information required to accurately measure the motor drive voltage.

Current Sense 1044: Passive analogue circuit which provides the microcontroller with the information it requires to accurately measure the current utilization.

3 Phase H Bridge 1046: A power electronics stage based on high speed switching MOSFETs, which provides 3 channels of switched power to the BLDC motor.

BLDC Motor 106. Brushless and Sensorless Direct Current Motor.

Back-EMF Filter 1048: This is a low pass analogue filter applied to the motors Back-EMF to remove unwanted high frequency information that would otherwise to detrimental to system control.

Temperature Sensor 1050: A factory calibrated temperature sensor, included for the purpose of measuring the temperature of the motor 106.

Accelerometer 1052: Electronic sensor capable of accurately sensing forces of acceleration including the earth's gravitational field.

Button A 112: Blend button.

Button B 110: Mix button.

The flow diagrams and processes herein should not be understood to prescribe a fixed order of performing the method steps depicted and described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the scope of the invention as set forth in the appended claims.

Figure 14:
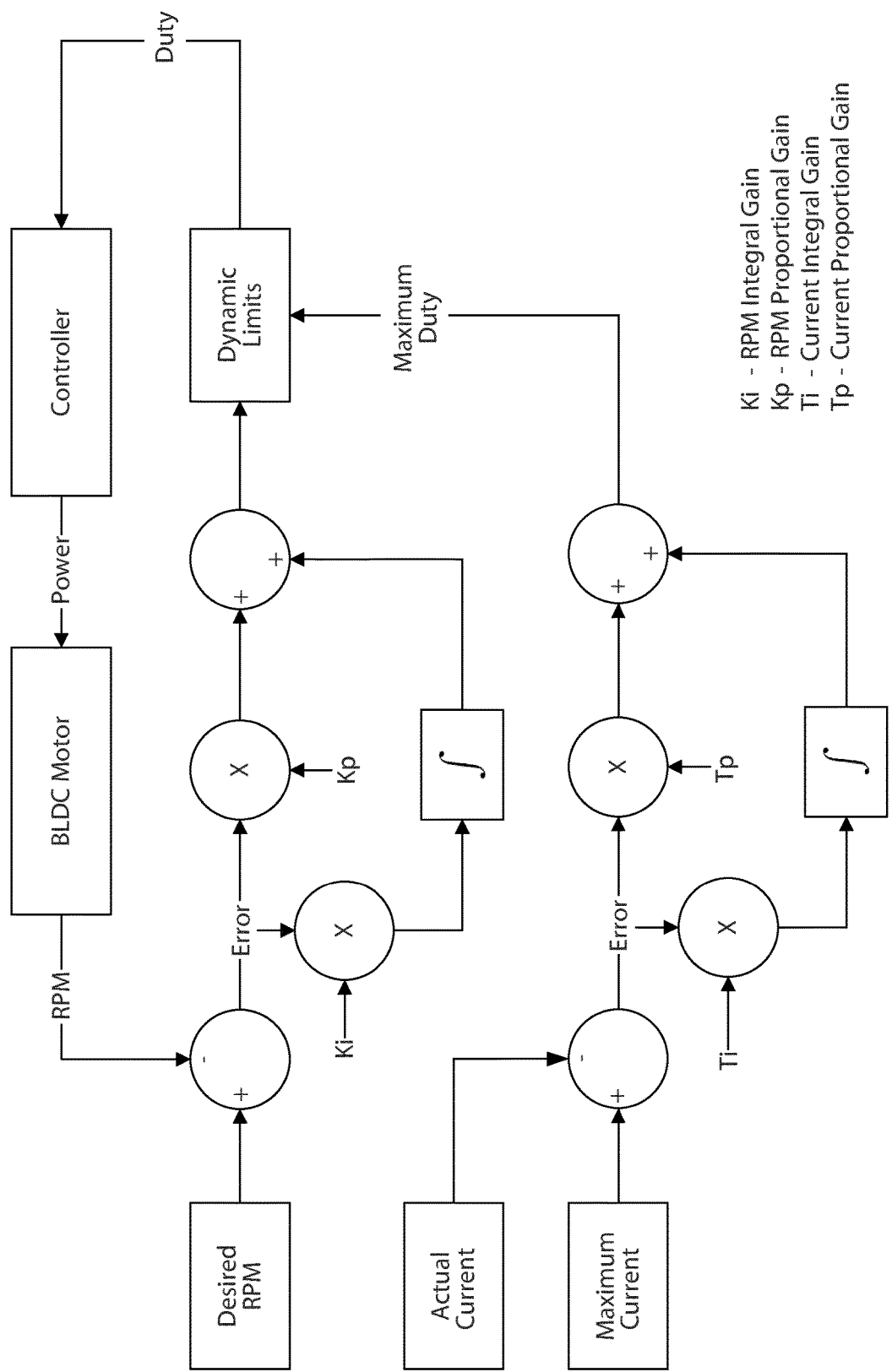

FIG. 14 depicts two PID controllers. In both these controllers the differential gain is set to zero and so this path is omitted from the diagram. Only the 'P' and the 'I' elements of 'RID' are implemented. The upper PID controller serves to regulate the motors rpm while the lower PID controller serves to prevent the actual current consumption exceeding the specified maximum. The PID controller is depicted as a continuous time controller but is implemented as an equivalent discrete time system in software. The phrase 'continuous time' is used here to refer to a system that is devoid of any time sampling. Such a system can never exist within a clocked microprocessor environment. For this reason the mathematical equivalent discrete time system which allows time sampling is used.

The regulation of rpm is the controller's primary task. Without regulation the speed of the motor would vary with both the load conditions and the battery charge level resulting in a larger variation in the time to perform a successful blend. The BLDC control software continually measures the motors rpm. This measured value is compared with a 'desired value' and the difference between the two taken as an error value, such that a negative error is produced when the measured rpm is too high. This error value follows two paths.

The first path is the 'proportional gain path' where the error signal is simply multiplied with the proportional gain value Kp. This path is responsive, ensuring that the combined system, the controller and the motor, responds quickly to changes in load. If this path were used without the inclusion of the second path, although the system would be responsive, it would be prone to small degrees of remaining error which never reduce to zero.

The second path is the 'integral gain path' where the signal is first of all multiplied by the coefficient Ki and then integrated. This path is less responsive but has the ability to integrate small errors to zero thus adding precision to the overall system. The combination of the two paths results in a system that is both responsive and precise.

The lower PID which is responsible for ensuring that the battery drain current does not exceed a specified maximum, works in a similar manner as the upper PID. The sole difference is that the lower PID mostly resides in a 'saturated state', whereby its output is permanently as a maximum value, when the actual measured current does not exceed the specified maximum. In this situation the 'error' is always a positive value. The proportional gain path will make a positive contribution to the output which passes to the 'Dynamic Limits'. Likewise the integral gain path will make an increasing positive contribution to the output. The net result is that we have an increasing positive value being passed to 'Dynamic Limits'. The function of 'Dynamic Limits' is to simply allow all values from the upper PID controller to pass through, subject to an upper limit defined by the lower PID controller. While the lower PID controller is in its 'saturated state' it has no effect on the output of the upper controller.

Should the measured current exceed the specified maximum, the 'error' generated by the lower PID controller would change to a negative value. The 'Maximum Duty' output would begin to fall and would reach a point at which its value becomes smaller than the output of the upper PID. At this point the upper PID would head toward saturation as its output is allowed to rise as the duty to the motor controller and the motor's measured rpm begin to fall. The lower PID is now effectively in control and maintains the current delivery to the motor at its maximum allowed value, up until such a point where the motor's measured rpm rises back to its desired value. At this point control reverts back to the upper PID. The upper and lower PID effectively exchange control between each other, according to which is asking for the lower current delivery, and never compete. The saturation values (maximum permissible values) of the integrators in both the upper PID and lower PID are dynamically set according to a proprietary algorithm which ensures maximal responsiveness and minimal overshoot as either PID exits saturation.

The invention claimed is:

1. A blending apparatus blade comprising one or more arms connected to a central hub and configured to be rotated in a first rotational direction to perform a blending operation and in a second rotational direction to perform a mixing operation,
    wherein the one or more arms each comprise:
        a first profile on a first edge of the arm, wherein the first edge is a leading edge when the blade is rotated in the first rotational direction and the first profile is configured to perform the blending operation; and
        a second profile on a second edge of the arm, wherein the second edge is a leading edge when the blade is rotated in the second rotational direction and the second profile is configured to perform the mixing operation,
    wherein at least one of the one or more arms is an inner arm angled upwardly relative to a plane normal to an axis of rotation of the blade; and
    wherein the inner arm comprises a main portion and a paddle portion, wherein the first edge of the inner arm is disposed on the main portion and the second edge is disposed on the paddle portion, and wherein the paddle portion extends from a side of the main portion opposite the first edge and is angled inwardly toward the axis of rotation of the blade relative to the main portion.

2. The blade of claim 1, wherein the first profile comprises a sharp edge and the second profile comprises a blunt edge.

3. The blade of claim 1, wherein the paddle portion is situated in a plane substantially parallel to the axis of rotation of the blade.

4. The blade of claim 1, wherein the paddle portion is angled upwardly relative to the main portion.

5. The blade of claim 1, wherein the blade comprises two inner arms.

6. The blade of claim 5, wherein the two inner arms are disposed opposite one another about the axis of rotation.

7. The blade of claim 1, wherein at least one of the one or more arms is an outer arm, the outer arm comprising a surface angled downwardly relative to a plane normal to the axis of rotation.

8. The blade of claim 7, wherein the surface angled downwardly comprises a distal portion of the outer arm.

9. The blade of claim 8, wherein the surface angled downwardly is further downwardly tilted relative to a direction of movement of the blade in the first rotational direction.

10. The blade of claim 7, wherein the surface angled downwardly is further downwardly tilted relative to a direction of movement of the blade in the first rotational direction.

11. The blade of claim 7, wherein the outer arm extends beyond the inner arm in a radial direction relative to the axis of rotation.

12. The blade of claim 7, wherein the blade comprises two outer arms.

13. The blade of claim 12, wherein the two outer arms are disposed opposite one another about the axis of rotation.

14. The blade of claim 1, wherein the blade is rotationally symmetric.

15. The blade of claim 1, wherein at least a portion of the first edge of the one or more arms is swept back in profile to prevent binding and/or lodging, in use.

16. The blade of claim 5, wherein the paddle portion is situated in a plane substantially parallel to the axis of rotation of the blade.

17. A blending apparatus comprising:
    a housing;
    a blade having one or more arms connected to a central hub and configured to be rotated in a first rotational direction to perform a blending operation and in a second rotational direction to perform a mixing operation, wherein the one or more arms each comprise:
        a first profile on a first edge of the arm, wherein the first edge is a leading edge when the blade is rotated in the first rotational direction and the first profile is configured to perform the blending operation; and
        a second profile on a second edge of the arm, wherein the second edge is a leading edge when the blade is rotated in the second rotational direction and the second profile is configured to perform the mixing operation;
    wherein at least one of the one or more arms is an inner arm angled upwardly relative to a plane normal to an axis of rotation of the blade; and
    wherein the inner arm comprises a main portion and a paddle portion, wherein the first edge of the inner arm is disposed on the main portion and the second edge is disposed on the paddle portion, and wherein the paddle portion extends from a side of the main portion opposite the first edge and is angled inwardly toward the axis of rotation of the blade relative to the main portion;
    a driver configured to drive the blade in the first rotational direction and the second rotational direction; and
    a controller configured to control the driver to selectively rotate the blade in the first rotational direction to perform a blending operation or in the second rotational direction to perform a mixing operation.

18. The apparatus of claim 17, further comprising:
a base; and
a power source,
wherein the power source and the driver are housed in the base.

19. The apparatus of claim 18, wherein the base is removable from the housing.

20. The apparatus of claim 18, wherein the power source is a battery.

21. The apparatus of claim 17, the apparatus further comprising a lid which sealingly engages with an open end of the main housing.

22. The apparatus of claim 21, wherein the lid further comprises a drinking spout with a removable cap.

23. The apparatus of claim 17, wherein the apparatus is portable.

24. The apparatus of claim 17, wherein the housing is sealable such that the contents of the apparatus can be sealed within the housing for transport.

25. The apparatus of claim 17, further comprising a USB outlet for providing power for charging other devices.

26. The apparatus of claim 17, wherein the first profile is configured such that, when rotated in the first direction at a predetermined speed, contents within the housing are blended and, wherein the second profile is configured such that, when rotated in the second direction at a second predetermined speed, contents within the housing are mixed.

27. The apparatus of claim 17, the apparatus further comprising an active electronic feedback speed control mechanism.

28. A method of controlling the blending apparatus of claim 17, the method comprising the steps of:
in response to a selection of a first blending mode, controlling the driver to rotate the blade in a first rotational direction at a first speed to perform a blending operation;
wherein during the blending operation a fluid vortex is formed having an inner surface that defines an air void, the first speed being selected so that said at least one inner arm is situated within the air void such that there is substantially no interaction between said at least one inner arm and the fluid vortex; and
in response to a selection of a mixing mode, controlling the driver to rotate the blade in a second rotational direction at a second speed to perform a mixing operation;
wherein during the mixing operation a fluid vortex is formed having an inner surface that defines an air void, the second speed being selected so that said at least one inner arm is not situated within the air void such that said at least one inner arm interacts with the fluid vortex.

29. The method of claim 28, wherein the first speed is greater than the second speed,
wherein the first speed is in the range of 6,000 to 9000 rpm, and
wherein the second speed is in the range of 3,000 to 5,000 rpm.

30. The method of claim 29, further comprising the step of determining whether or not a blending operation has been authorized.

31. The method of claim 28, further comprising the step of determining whether or not a blending operation has been authorized.

32. The method of claim 31, wherein the step of controlling the driver to rotate the blade in the first rotational direction at the first speed to perform a blending operation only occurs if a blending operation has been authorized.

33. The method of claim 32, wherein the step of determining whether or not a blending operation has been authorized further comprises determining whether or not a security sequence has been correctly entered.

34. The method of claim 31, wherein the step of determining whether or not a blending operation has been authorized further comprises determining whether or not a security sequence has been correctly entered.

35. The method of claim 31, wherein the step of determining whether or not a blending operation has been authorized further comprises the detecting whether the blending apparatus is in a predetermined orientation.

36. The method of claim 28, further comprising the step of determining whether or not the torque limit of a motor of the blending apparatus exceeds a pre-defined torque limit and, optionally, slowing down, switching off or braking the motor if the pre-defined torque limit is exceeded.

37. The method of claim 28, further comprising the step of, in response to a subsequent selection, controlling the driver to cease rotation of the blade.

38. The method of claim 37, wherein the subsequent selection is a de-selection.

39. The method of claim 28, wherein the step of controlling the driver to rotate the blade in the first rotational direction to perform the blending operation further comprises, in response to a subsequent selection of a second blending mode, controlling the driver to rotate the blade in the first rotational direction at a third speed greater than the first speed,
wherein the third speed is in the range of 10,000 to 14,000 rpm.

40. The method of claim 39, wherein the step of controlling the driver to rotate the blade in the first rotational direction at the third speed greater than the first speed further comprises, in response to a subsequent constant selection of a third blending mode, controlling the driver to rotate the blade in the first rotational direction at a fourth speed greater than the third speed for the duration of the constant selection of the third blending mode,
wherein the fourth speed is in the range of 15,000 to 20,000 rpm.

41. The method of claim 40, wherein the step of controlling the driver to rotate the blade in the first rotational direction at the fourth speed for the duration of the constant selection of the third blending mode, further comprises the step of, in response to an end of the constant selection of the third blending mode, controlling the driver to rotate the blade in the first rotational direction at the third speed.

42. The method of claim 39, wherein the step of controlling the driver to rotate the blade in the first rotational direction at the third speed greater than the first speed further comprises, in response to a subsequent selection of the first blending mode, controlling the driver to rotate the blade in the first rotational direction at the first speed.

43. The method of claim 39, wherein the step of controlling the driver to rotate the blade in the first rotational direction at the first speed further comprises, in response to a subsequent selection, controlling the driver to cease rotation of the blade.

44. The method of claim 43, wherein the subsequent selection is a de-selection.

* * * * *